US011006419B2

United States Patent
Li et al.

(10) Patent No.: US 11,006,419 B2
(45) Date of Patent: *May 11, 2021

(54) SIGNALLING OF FREQUENCY-DOMAIN RESOURCE ASSIGNMENT

(71) Applicant: Telefonaktiebolaget LM Ericsson (publ), Stockholm (SE)

(72) Inventors: Jingya Li, Gothenburg (SE); Robert Baldemair, Solna (SE); Xingqin Lin, Santa Clara, CA (US); Zhipeng Lin, Nanjing (CN); Stefan Parkvall, Bromma (SE); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,014

(22) Filed: Sep. 10, 2019

(65) Prior Publication Data

US 2020/0008202 A1 Jan. 2, 2020

Related U.S. Application Data

(63) Continuation of application No. 16/351,798, filed on Mar. 13, 2019, now Pat. No. 10,455,582, which is a continuation of application No. PCT/CN2018/080711, filed on Mar. 27, 2018.

(51) Int. Cl.
*H04W 72/04* (2009.01)
*H04W 28/20* (2009.01)
*H04L 5/00* (2006.01)

(52) U.S. Cl.
CPC ....... *H04W 72/0453* (2013.01); *H04L 5/0044* (2013.01); *H04L 5/0094* (2013.01);
(Continued)

(58) Field of Classification Search
CPC ................................................ H04W 72/0453
See application file for complete search history.

(56) References Cited

U.S. PATENT DOCUMENTS

| 10,029,095 | B2* | 7/2018 | Van Der Borght .. H04R 25/556 |
| 2013/0163532 | A1* | 6/2013 | Anderson ......... H04W 72/1278 370/329 |

(Continued)

FOREIGN PATENT DOCUMENTS

RU 2603010 C2 11/2016

OTHER PUBLICATIONS

"3GPP TS 38.212 V15.4.0", 3rd Generation Partnership Project; Technical Specification Group Radio Access Network; NR; Multiplexing and channel coding (Release 15), Dec. 2018, pp. 1-100.
(Continued)

Primary Examiner — Andrew Lai
Assistant Examiner — Andrew C Lee
(74) Attorney, Agent, or Firm — Murphy, Bilak & Homiller, PLLC

(57) ABSTRACT

Embodiments include methods for receiving, by a user equipment (UE) in a wireless network, assignment of frequency-domain resources of a communication channel. Such embodiments include receiving an indication of an active carrier bandwidth part (BWP) of a size $N_{BWP,1}^{size}$ frequency-domain resource blocks (RBs). Such embodiments include receiving, via a downlink control channel, an indication of assigned frequency-domain RB(s) within the active BWP, with the indication being encoded with a plurality of bits related to a size $N_{BWP,2}^{size}$ of a BWP than the active BWP, where $N_{BWP,2}^{size} < N_{BWP,1}^{size}$. Such embodiments include decoding the indication to obtain the assigned RB(s) represented by a starting virtual RB and a length of contiguously allocated RBs. The starting virtual RB is
(Continued)

encoded with a resolution of K RBs, with K based on a ratio of $N_{BWP,1}^{size}$ and $N_{BWP,2}^{size}$. Embodiments also include complementary methods performed by network nodes, and apparatus configured to perform these methods.

21 Claims, 16 Drawing Sheets

(52) U.S. Cl.
CPC ......... *H04W 28/20* (2013.01); *H04W 72/042* (2013.01); *H04L 5/0007* (2013.01)

(56) References Cited

U.S. PATENT DOCUMENTS

| | | | | |
|---|---|---|---|---|
| 2013/0163536 | A1* | 6/2013 | Anderson | H04L 5/0037 370/329 |
| 2013/0163537 | A1* | 6/2013 | Anderson | H04W 72/1284 370/329 |
| 2013/0182676 | A1* | 7/2013 | Lee | H04L 5/001 370/329 |
| 2014/0362722 | A1* | 12/2014 | Loehr | H04W 72/0453 370/252 |
| 2015/0049700 | A1 | 2/2015 | Liu et al. | |
| 2016/0007324 | A1* | 1/2016 | Lee | H04L 5/0055 370/329 |
| 2016/0044724 | A1* | 2/2016 | Seo | H04W 72/0446 370/329 |
| 2016/0197666 | A1* | 7/2016 | Kim | H04B 7/14 370/315 |
| 2017/0041103 | A1* | 2/2017 | Maattanen | H04B 7/0626 |
| 2018/0270807 | A1* | 9/2018 | Salem | H04L 5/0048 |
| 2018/0323830 | A1* | 11/2018 | Park | H04B 7/024 |

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.
"3GPP TS 38.321 V15.4.0", 3rd Generation Partnership Project; Technical Specification Group Radio Access Network; NR; Medium Access Control (MAC) protocol specification (Release 15), Dec. 2018, pp. 1-77.
"3GPP TS 38.213 V15.4.0", 3rd Generation Partnership Project; Technical Specification Group Radio Access Network; NR; Physical layer procedures for control (Release 15), Dec. 2018, pp. 1-104.
"3GPP TS 38.214 V15.4.0", 3rd Generation Partnership Project; Technical Specification Group Radio Access Network; NR; Physical layer procedures for data (Release 15), Dec. 2018, pp. 1-102.
"3GPP TS 38.211 V15.0.0", 3rd Generation Partnership Project; Technical Specification Group Radio Access Network; NR; Physical channels and modulation (Release 15), Dec. 2017, pp. 1-73.
"3GPP TS 38.331 V15.4.0", 3rd Generation Partnership Project; Technical Specification Group Radio Access Network; NR; Radio Resource Control (RRC) protocol specification (Release 15), Dec. 2018, pp. 1-474.
"On remaining details on BWPs", 3GPP TSG-RAN WG1 Meeting #92; R1-1802539; Athens, Greece, Feb. 26-Mar. 2, 2018, pp. 1-10.
"Summary of 7.1.3.1.4 (DCI contents and formats)", TSG-RAN WG1 #92; R1-1803232; Athens, Greece, Feb. 26-Mar. 2, 2018, pp. 1-20.
"Wider Bandwidth Operations", 3GPP TSG RAN WG1 NR Meeting# 90; R1-1713654; Prague, Czech Republic, Aug. 21-26, 2017, pp. 1-10.
"DCI contents and formats", 3GPP TSG RAN WG1 adhoc_NR_AH_1801; Jan. 13, 2018, pp. 1-14.
"DL/UL Frequency Resource Allocation", 3GPP TSG RAN WG1 #90; R1-1713635, Aug. 11, 2017, pp. 1-11.
"Ericsson, TP section 5.1.2.2 of 38.214 from agenda point 7.3.1.4", 3GPP TSG RAN WG1 adhoc_NR_AH_1801; R1-1801208, Jan. 29, 2018, pp. 1-8.
"Remaining issues on DCI contents and formats", 3GPP TSG RAN WG1 #92; R1-1801337, Feb. 17, 2018, pp. 1-8.
"On data resource allocation for NR", 3GPP TSG RAN WGl Meeting #90; R1-1716482; Nagoya, Japan, Sep. 18-21, 2017, pp. 1-5.
"Remaining issues of the DCI contents and formats", 3GPP TSG-RAN WGl #92; R1-1802905; Athens, Greece, Feb. 26-Mar. 2, 2018, pp. 1-11.

* cited by examiner

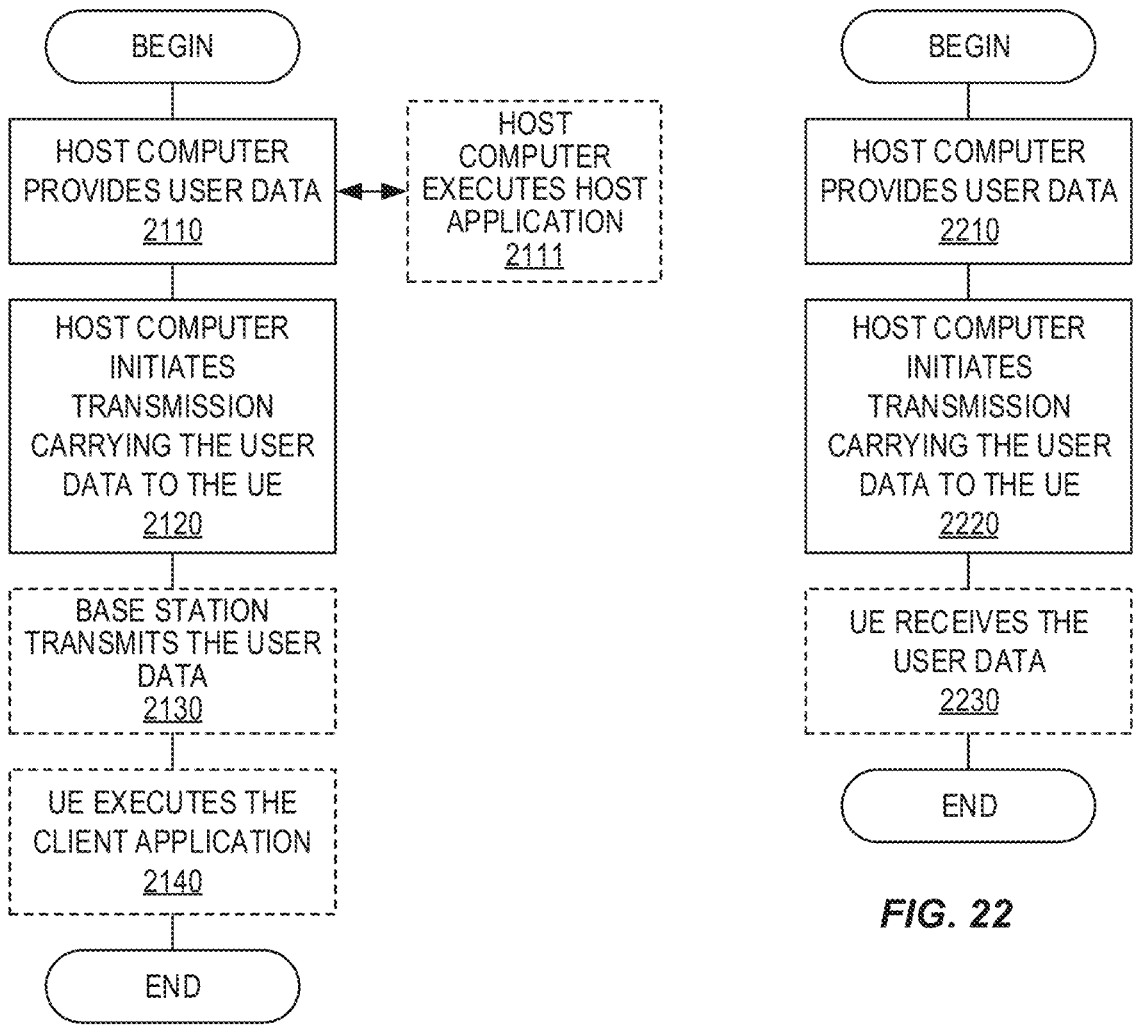

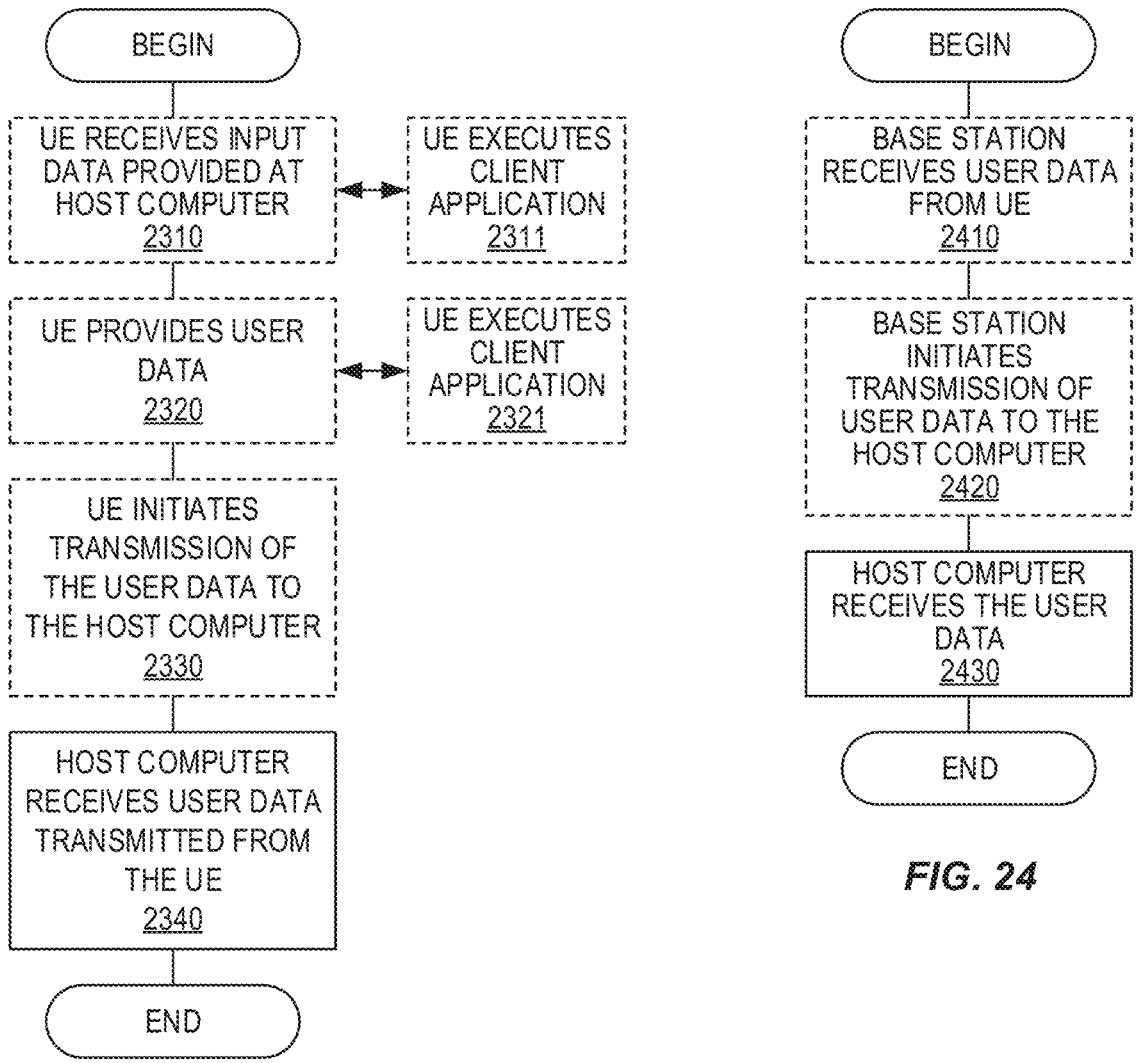

SIGNALLING OF FREQUENCY-DOMAIN RESOURCE ASSIGNMENT

RELATED APPLICATIONS

This application claims the benefit of priority from U.S. application Ser. No. 16/351,798 filed Mar. 13, 2019 and issued as U.S. Pat. No. 10,455,582 on Oct. 22, 2019, which claims the benefit of priority from International Appl. PCT/CN2018/080711 filed on Mar. 27, 2018. The entire disclosure of the above-mentioned applications are incorporated herein by reference for all purposes.

TECHNICAL FIELD

Embodiments of the present disclosure generally relate to wireless communication networks, and particularly relates to improving the transmission and/or reception of data in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 1 shows the radio frame structure used for FDD downlink (DL) operation. The radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary downlink slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as shown in FIG. 1, but comprises $N^{UL}_{symb}$ OFDM symbols, each of which is comprised of $N_{sc}$ OFDM subcarriers.

As shown in FIG. 1, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz SCS) or 24 (7.5-kHz SCS). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY downlink comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs. The configuration of 15-kHz SCS and "normal" CP is often referred as the numerology, µ.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carries 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs can be mapped to non-consecutive PRBs according to various rules, as described in 3GPP Technical Specification (TS) 36.214 V15.0.0 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

As discussed above, the LTE PHY maps the various downlink and uplink physical channels to the resources shown in FIG. 1. For example, the PDCCH carries scheduling assignments, channel quality feedback (e.g., CSI) for the uplink channel, and other control information. Likewise, a Physical Uplink Control Channel (PUCCH) carries uplink control information such as scheduling requests, CSI for the downlink channel, hybrid ARQ feedback, and other control information. Both PDCCH and PUCCH are transmitted on aggregations of one or several consecutive control channel elements (CCEs), and a CCE is mapped to the physical resource shown in FIG. 1 based on resource element groups (REGs), each of which is comprised of a plurality of REs. For example, a CCE may be comprised of nine (9) REGs, each of which is comprised of four (4) REs.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms (or less) end-to-end latency. For eMBB, the requirements on latency and error probability can be less stringent whereas the required supported peak rate and/or spectral efficiency can be higher.

In Release-15 (Rel-5) NR, a UE can be configured with up to four carrier bandwidth parts (BWPs) in the downlink (DL), with a single downlink carrier BWP being active at any given time. Likewise, a UE can be configured with up to four carrier BWPs in the uplink, with a single uplink carrier BWP being active at a given time. If a UE is configured with a supplementary uplink, the UE can also be configured with up to four supplementary carrier BWPs in the supplementary uplink with a single supplementary uplink BWP part being active at a given time.

In NR, a carrier BWP (e.g., an active BWP) can be configured with up to 275 RBs. Similar to LTE, an NR resource block (RB) (also referred to as "frequency-domain RB") is defined as $N_{sc}^{RB}=12$ consecutive subcarriers in the frequency domain. When scheduling a UE to receive PDSCH or transmit PUSCH, the network must allocate specific frequency-domain resources (i.e., RBs or RB groups, also referred to as RBGs) within the active BWP. As described above with respect to LTE, this allocation is performed using DCI sent via PDCCH. Due to strict limitations in DCI size, however, there can arise situations in which the number of bits available for signalling the resource allocation within the active BWP does not match the number of RBs in the active BWP. For example, the number of available bits can be insufficient to signal and/or indicate to the UEs all of the relevant combinations of RB allocations in the active BWP, including various starting positions and lengths. Accordingly, conventional approaches (e.g., as in LTE) for signalling frequency-domain resource assignments are inadequate.

SUMMARY

Accordingly, exemplary embodiments of the present disclosure address shortcomings in existing techniques (e.g., in LTE) for signalling frequency-domain resource allocation, thereby enabling the otherwise-advantageous deployment of NR solutions.

Such exemplary embodiments can include methods and/or procedures for a network node in a wireless communication network to assign, to a user equipment (UE), frequency-domain resources of a communication channel shared with one or more further UEs, such as PDSCH or PUSCH mentioned above. The exemplary methods and/or procedures can include sending, to the UE, an indication of an active carrier bandwidth part (BWP) usable for communicating via the shared channel. The exemplary methods and/or procedures can also include selecting one or more frequency-domain resource blocks (RBs), within the active BWP, to be assigned to the UE. The exemplary methods and/or procedures can also include encoding an indication of the one or more selected RBs using a plurality of available bits, wherein the plurality of available bits is insufficient to encode all assignable combinations of RBs within the active BWP. The exemplary methods and/or procedures can also include sending the encoded indication to the UE via a downlink control channel. The exemplary methods and/or procedures can also include transmitting or receiving data using the selected RBs.

Exemplary embodiments can include methods and/or procedures for a user equipment (UE) to receive, from a network node in a wireless communication network, an assignment of frequency-domain resources of a communication channel shared with one or more further UEs. The exemplary methods and/or procedures can include receiving, from the network node, an indication of an active carrier bandwidth part (BWP) usable for communicating via the shared channel. The exemplary methods and/or procedures can also include receiving, via a downlink control channel, an indication of one or more assigned frequency-domain resource blocks (RBs) within the active BWP, wherein the indication is encoded with a plurality of bits that are insufficient to encode all assignable combinations of RBs within the active BWP. The exemplary methods and/or procedures can also include decoding the indication to obtain the one more assigned RBs within the active RBs. The exemplary methods and/or procedures can also include transmitting or receiving data using the assigned RBs.

Exemplary embodiments also include network nodes (e.g., base station, gNB, eNB, en-gNB, ng-eNB, etc., or component thereof) or user equipment (UEs, e.g., wireless device, IoT device, modem, etc., or component thereof) configured to perform the operations of the above-described exemplary methods and/or procedures. Exemplary embodiments also include non-transitory, computer-readable media storing computer-executable instructions that, when executed by processing circuitry of such network nodes or UEs, configure the network node or the UE to perform operations corresponding to any operations or procedure described herein. Exemplary embodiments also include computer program products that include such executable instructions.

By more efficient use of the bits available for signalling resource assignments, these and other exemplary embodiments can improve the usage efficiency of physical downlink control channels (PDCCH) in NR, resulting in improvements to the latency of resource assignement and in the number of UEs that can utilize a particular PDCCH resource. Other exemplary benefits include reduced latency in the network, leading to improved end user performance or quality of experience. Other exemplary benefits include reduced hardware requirements (e.g., fewer processors and memories), which can reduce network deployment cost and reduce environmental impact caused by manufacture, shipping, installation, etc. of hardware components.

BRIEF DESCRIPTION OF THE DRAWINGS

FIGS. 21-24 are flow diagrams of exemplary methods and/or procedures for transmission and/or reception of user data that can be implemented, for example, in the exemplary communication systems and/or networks illustrated in FIGS. 19-20.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

As mentioned above, due to strict limitations in PDCCH DCI size, there can arise situations in which the number of bits available for signalling a frequency-domain resource allocation within a UE's active BWP does not match the number of RBs in the active BWP.

For example, the number of available bits can be insufficient to signal and/or indicate to the UEs all of the relevant combinations of RB allocations in the active BWP, including various starting positions and lengths. This is discussed in greater detail below.

Figure 1:
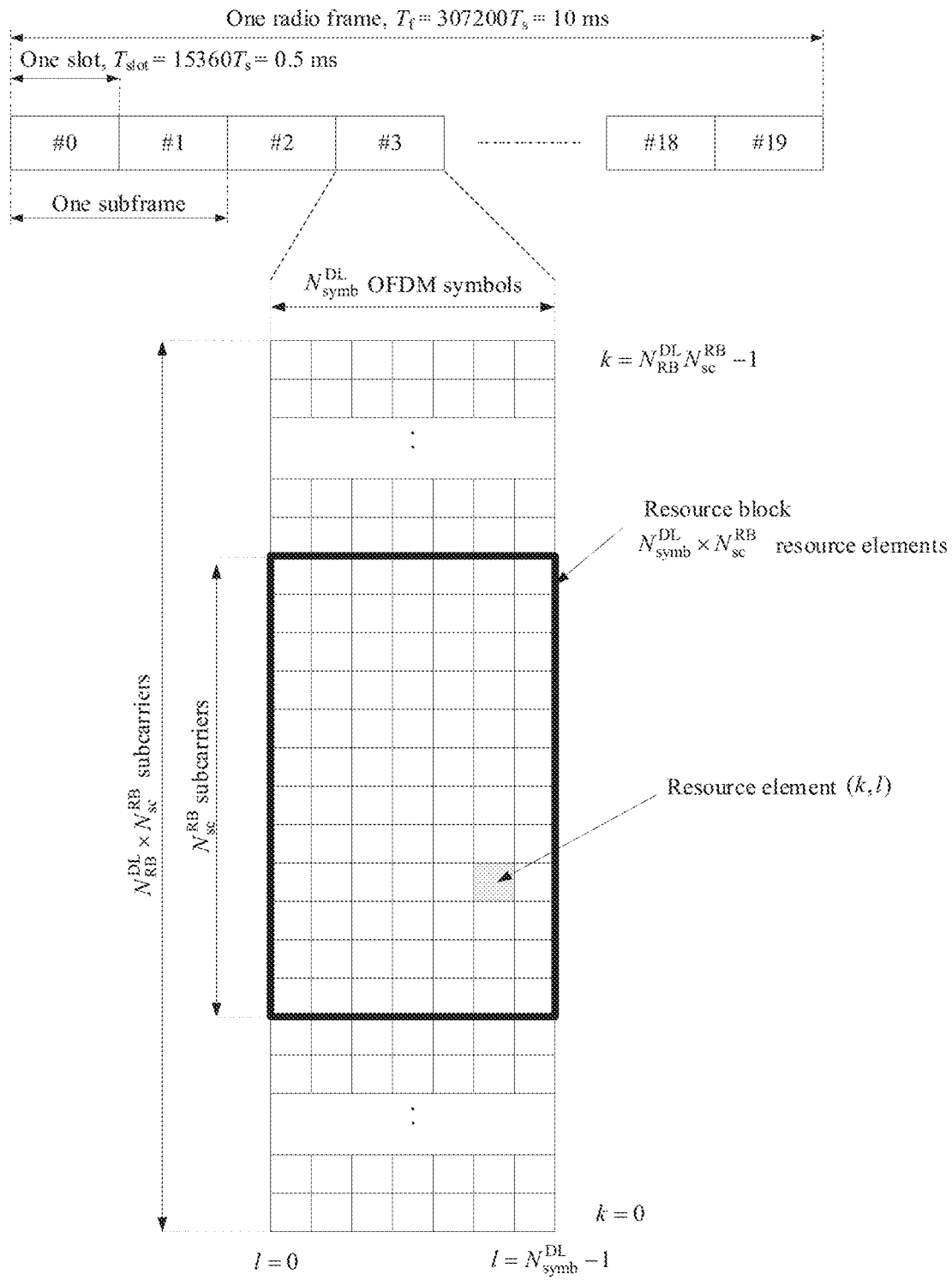
FIG. 1 is a block diagram of exemplary downlink and uplink LTE radio frame structures used for frequency division duplexing (FDD) operation.
Figure 2:
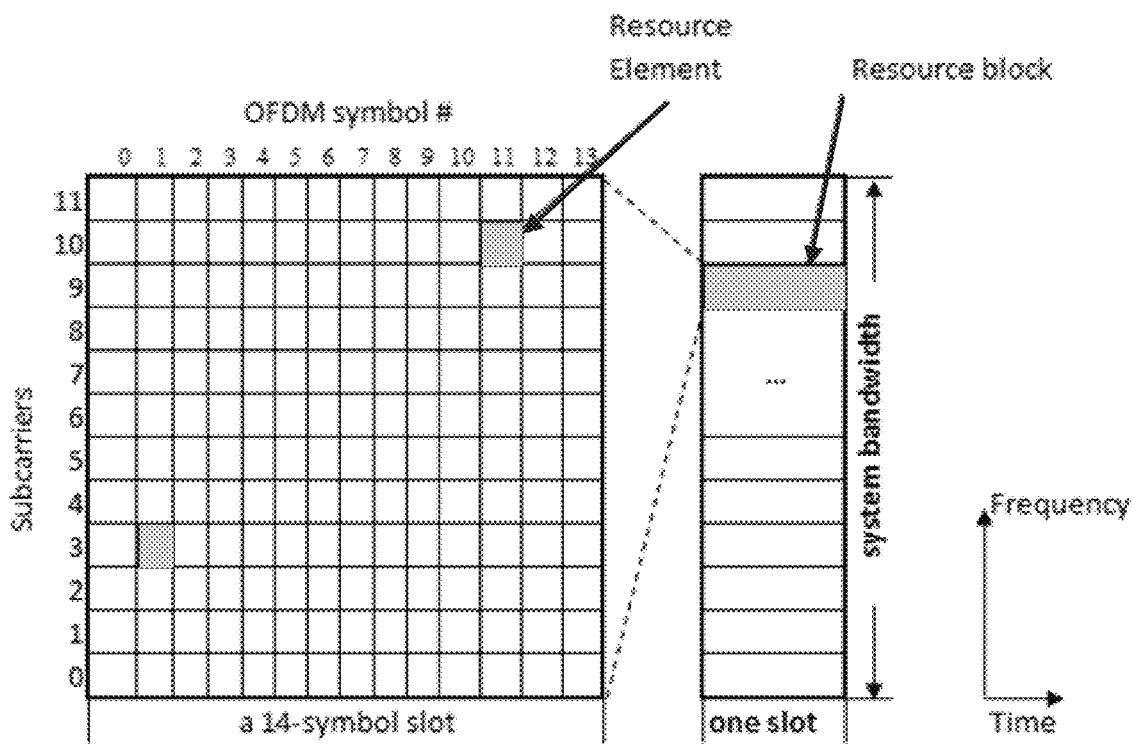
FIG. 2 shows an exemplary time-frequency resource grid for an NR slot.

FIG. 2 shows an exemplary time-frequency resource grid for an NR slot. As illustrated in FIG. 2, a resource block (RB) consists of a group of 12 contiguous OFDM subcarriers for a duration of a 14-symbol slot. Like in LTE, a resource element (RE) consists of one subcarrier in one symbol. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP,i}^{size}-1$ where i is the index of the particular BWP for the carrier. Similar to LTE, each NR resource element (RE) corresponds to one OFDM subcarrier during one OFDM symbol interval. Various SCS values (referred to as numerologies) are supported in NR and are given by $\Delta f=(15\times2^{\alpha})$ kHz where $\alpha \in (0, 1, 2, 3, 4)$. The basic (or reference) subcarrier spacing of $\Delta f=15$ kHz is also used in LTE. The slot length is inversely related to subcarrier spacing or numerology according to $\frac{1}{2}^{\alpha}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^{\alpha}*180$ kHz.

Table 1 below summarizes the supported NR transmission numerologies and associated parameters. Different DL and UL numerologies can be configured by the network.

TABLE 1

| μ | $\Delta f = 2^{\mu} \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 3A:
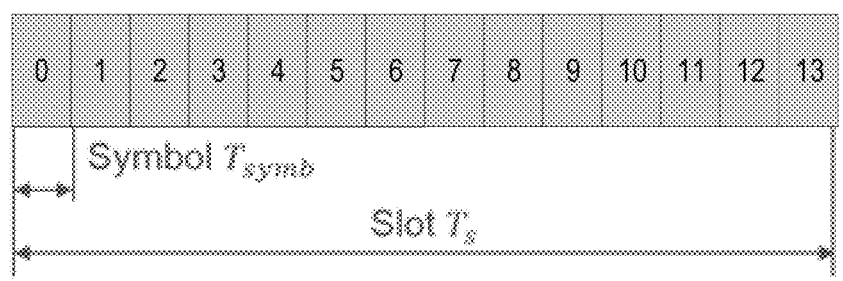
FIGS. 3A-B shows various exemplary NR slot configurations.

An NR slot can include 14 symbols with normal cyclic prefixes and 12 symbols with extended cyclic prefixes. FIG. 3A shows an exemplary NR slot configuration comprising 14 OFDM symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Similar to LTE, NR data scheduling is done on a per-slot basis. In each slot, for downlink data scheduling, a base station (e.g., gNB) transmits downlink control information (DCI) over PDCCH that indicates which UE is scheduled to receive data in that slot and which RBs will carry that data. A UE first detects and decodes DCI and, if successful, then decodes the corresponding PDSCH based on the decoded DCI. Likewise, DCI can include UL grants that indicate which UE is scheduled to transmit data in a slot and which RBs will carry the data. A UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc.

To determine the modulation order, target code rate, and transport block size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (υ) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2.

In NR, there is also a possibility to configure semi-persistent scheduling in the DL, in which a PDSCH transmission periodicity is configured by RRC and then the start and stop of such transmission is controlled by DCI. This technique can reduce control signaling overhead. There is a similar UL scheduling feature, referred to as configured grants (CG).

Within an NR slot, the PDCCH channels are confined to a particular number of symbols and a particular number of subcarriers, where this region is referred to as the control resource set (CORESET). A CORESET is made up of multiple RBs (i.e., multiples of 12 REs) in the frequency domain and either one, two, or three OFDM symbols in the time domain, as further defined in 3GPP TS 38.211 V15.0.0 clause 7.3.2.2. A CORESET is functionally similar to the control region in LTE subframe. One difference, however, is that in NR, each REG consists of the 12 REs of one OFDM symbol in a RB, whereas an LTE REG includes only four REs, as discussed above. Like in LTE, the CORESET time domain size can be indicated by Physical Control Format Indicator Channel (PCFICH). In LTE, the frequency bandwidth of the control region is fixed (i.e., to the total system bandwidth), whereas in NR, the frequency bandwidth of the CORESET is variable. CORESET resources can be indicated to a UE by RRC signaling.

Figure 3B:
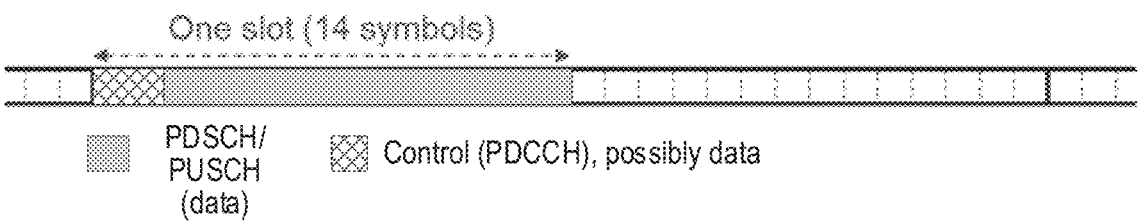

FIG. 3B shows an exemplary NR slot structure with 15-kHz subcarrier spacing. In this exemplary structure, the first two symbols contain PDCCH and each of the remaining 12 symbols contains physical data channel (PDCH), i.e., either a PDSCH or PUSCH. Depending on the CORESET configuration, however, the first two slots can also carry PDSCH or other information, as required.

Figure 4:
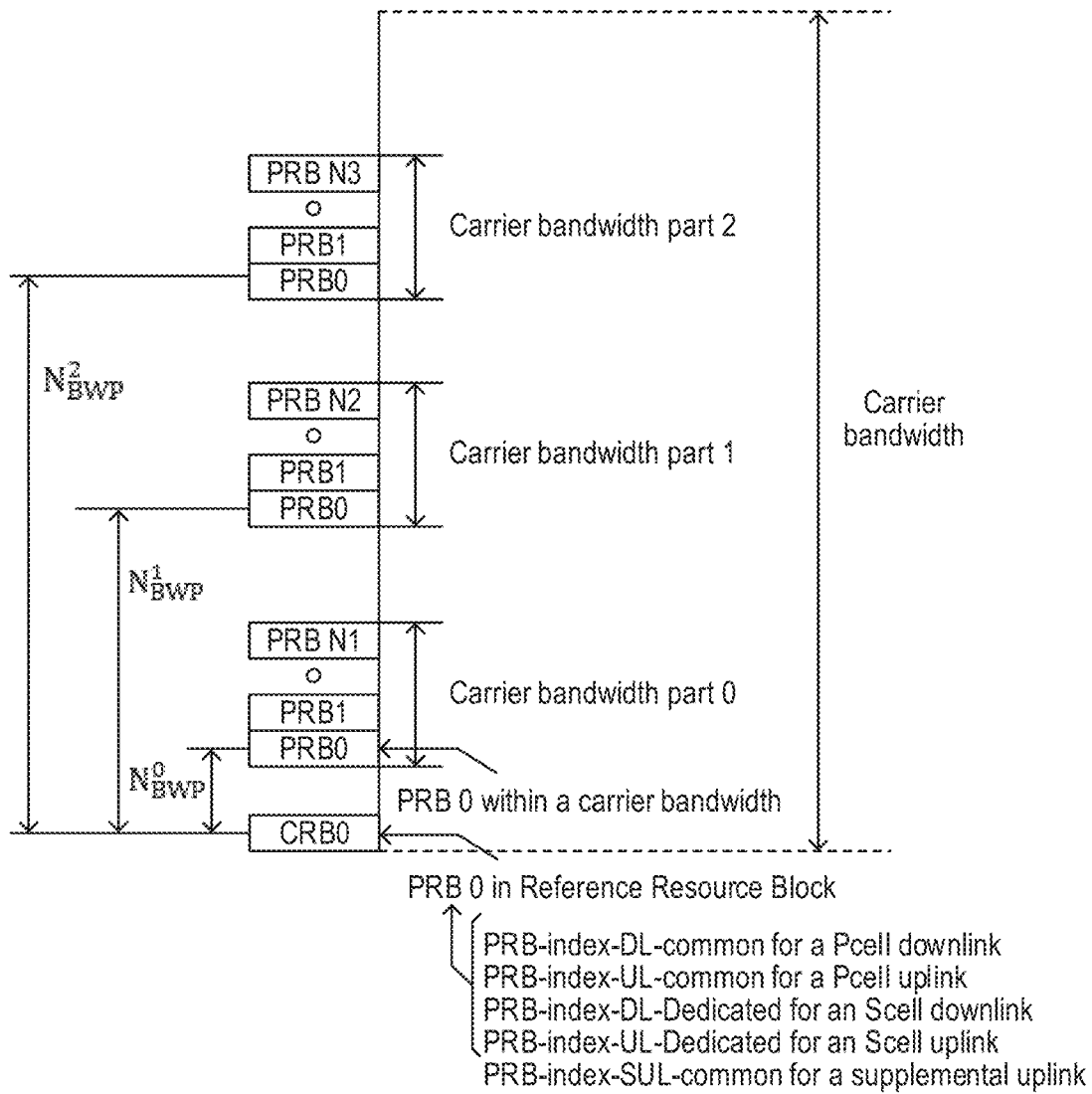
FIG. 4 shows exemplary carrier bandwidth part (BWP) configurations for NR.

An example of NR configurations, including PRBs within carrier BWPs, is shown in FIG. 4. For a carrier BWP with a given numerology $\mu_i$, a contiguous set of physical resource blocks (PRBs) are defined and numbered from 0 to $N_{BWP,j}^{size}+1$, where is the index number of the carrier bandwidth part. In NR, each of the carrier BWPs can be configured with one of the numerologies listed in Table 1 above.

Various physical channels are also defined by 3GPP standards for 5G/NR. A downlink physical channel corresponds to a set of resource elements carrying information originating from higher layers. The following NR downlink (DL) physical channels are defined:
Physical Downlink Shared Channel, PDSCH;
Physical Broadcast Channel, PBCH; and
Physical Downlink Control Channel, PDCCH.
PDSCH is the main physical channel used for unicast downlink data transmission, but also for transmission of RAR (random access response), certain system information blocks (SIBs), and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink (UL) physical channel corresponds to a set of resource elements carrying information originating from higher layers. The following uplink physical channels are defined for NR:
Physical Uplink Shared Channel, PUSCH;
Physical Uplink Control Channel, PUCCH; and
Physical Random Access Channel, PRACH.
PUSCH is the uplink counterpart to the PDSCH. PUCCH is used by UEs to transmit uplink control information, including HARQ acknowledgements, channel state information (CSI) reports, etc. PRACH is used for random access preamble transmission.

In general, an NR UE can determine the RB assignment in the frequency domain for PUSCH or PDSCH based on the resource allocation field in the detected DCI carried in PDCCH. For PUSCH carrying msg3 in a random-access procedure, the frequency domain resource assignment is signaled by using the UL grant contained in RAR. In NR, two frequency resource allocation schemes, type 0 and type 1, are supported for PUSCH and PDSCH. The particular type to use for a PUSCH/PDSCH transmission is either defined by an RRC-configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall upon detection of PDCCH intended for the UE determine first the uplink/downlink carrier bandwidth part and then the resource allocation within the carrier bandwidth part. The UL BWP for PUSCH carrying msg3 is configured by higher layer parameters. In resource allocation of type 0, the frequency domain resource assignment information includes a bitmap indicating the Resource Block Groups (RBGs) that are allocated to the scheduled UE where a RBG is a set of consecutive physical resource blocks. The RBG size can be configured to 2, 4, 8, or 16.

On the other hand, in resource allocation type 1, the frequency domain resource assignment information consists of a resource indication value (RIV) corresponding to a starting virtual resource block ($RB_{start}$) and a length in terms of contiguously allocated resource blocks $L_{RBs}$. The resource indication value is defined by if $(L_{RBs}-1) \leq \lfloor N_{BWP}^{size}/2 \rfloor$ then RIV=$N_{BWP}^{size}(L_{RBs}-1)+RB_{start}$ else RIV=$N_{BWP}^{size}(N_{BWP}^{size}-L_{RBs}+1)+(N_{BWP}^{size}-1-RB_{start})$ where $L_{RBs} \geq 1$ and shall not exceed $N_{BWP}^{size}-RB_{start}$; and $N_{BWP}^{size}$ is the number of RBs in the corresponding BWP.

Figure 5:
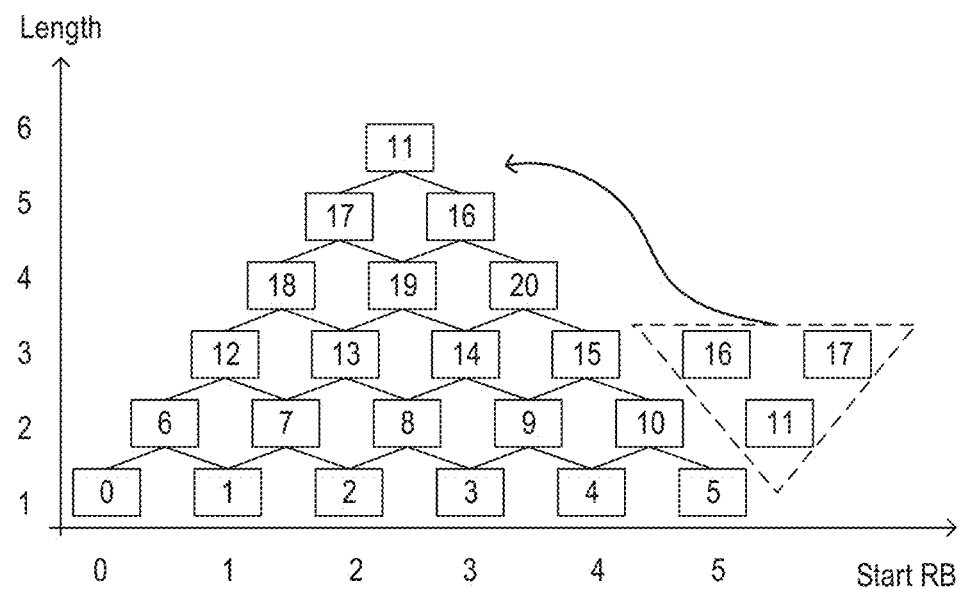
FIG. 5 shows an exemplary resource indication value (RIV) as a function of a starting virtual resource block and a length.

FIG. 5 illustrates an example of RIV encoding with a BWP of 6 RBs. In the figure, the number in each box corresponds to a coded RIV, and it is mapped to a starting virtual resource block ($RB_{start}$) and a length $L_{RBs}$. Note that in FIG. 5, the mapping between a coded RIV value and the corresponding starting virtual resource block ($RB_{start}$) follows the left-most line though the graph nodes to the bottom layer. For example, a coded value of RIV=13 corresponds to a set of allocated RBs with indices 1, 2 and 3, that is $RB_{start}=1$ and $L_{RBs}=3$. As another example, a coded value of RIV=10 corresponds to a set of allocated RBs with indices 4 and 5, that is $RB_{start}=4$ and $L_{RBs}=2$.

The number of bits needed for indicating all possible RIV values can be calculated by $\lceil \log_2(N_{BWP}^{size}(N_{BWP}^{size}+1)/2) \rceil$.

In this example, five (5) bits are needed to indicate all possible values of the coded RIV, i.e., to indicate all possible starting positions and lengths.

Signaling of frequency domain resource assignment based on RIV encoded with quantized starting virtual resource block ($RB_{start}$) and length ($L_{RBs}$) was supported in the LTE standard, e.g., type-2 resource block assignment field in DCI format 1C for very compact scheduling of one PDSCH codeword transmission; DCI format 7-1A/7-1B for subslot/slot based PDSCH transmission; and type 0 resource block assignment field in DCI format 7-0A/7-0B for subslot/slot based PUSCH transmission. For all these signaling methods, the same quantization step size is assumed for the starting RB position and the length. In addition, the minimum allocable length is limited to the step size (i.e., it cannot be one).

In NR, a carrier bandwidth part can be configured with up to 275 RBs. In this case, the frequency domain resource assignment field requires at least 18 bits (with RBG size equal to 16) if using frequency resource allocation type 0. If resource allocation type 1 is used, then, the number of frequency domain resource assignment field can be reduced to 16 bits. Furthermore, the number of bits for type 1 resource allocation may be defined based on another BWP than the one to which the resource allocation should be applied. Similarly, due to other constraints, the number of signaling bits may not be sufficient for frequency domain resource assignment in the active BWP on which PDSCH/PUSCH is scheduled to be transmitted. In addition, for some special cases (e.g., msg3 transmission in a random access procedure), the requirements of the RB resolution for starting RB position and length can be different.

Exemplary embodiments of the present disclosure mitigate, reduce, and/or eliminate the above-described issues related to legacy and/or existing frequency-domain resource allocation signalling techniques. For example, such embodiments can support NR frequency-domain resource allocation to UEs for PUSCH and PDSCH when the number of bits available for the frequency domain resource assignment field does not match the number of RBs in the active BWP. In this manner, such embodiments can provided resource allocation flexibility in the frequency domain, allowing more flexible and/or efficient use of scarce spectrum resources for NR services.

More specifically, various exemplary embodiments of the present disclosure can signal a UE's frequency domain resource assignment for PUSCH/PDSCH transmission by using a resource indication value (RIV) corresponding to a starting virtual resource block ($RB_{start}$) and a length in terms of contiguously allocated resource blocks $L_{RBs}$. The number of bits for indicating the RIV is mismatched with the number of RBs in the BWP in which PUSCH or PDSCH is scheduled to be transmitted. Here, mismatch is defined as the number of bits for indicating RIV is different from $\lceil \log_2 (N_{BWP}^{size}(N_{BWP}^{size}+1)/2) \rceil$, where $N_{BWP}^{size}$ is the number of RBs in the BWP. Exemplary embodiments can signal the UE's frequency-domain resource assignment in various ways, which are described below in more detail.

Figure 6:
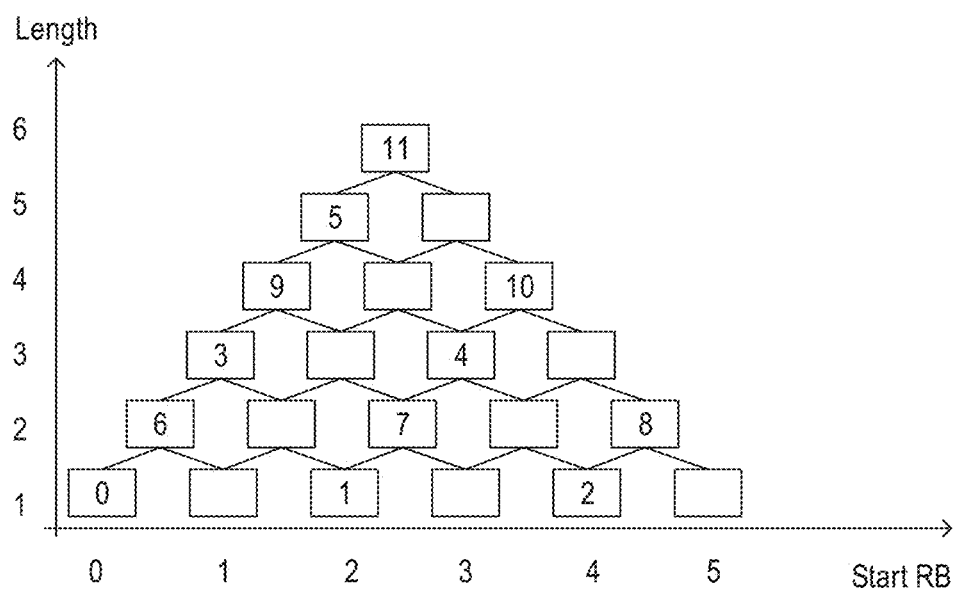
FIGS. 6-13 show various exemplary RIV encoding configurations according to various embodiments of the present disclosure.
Figure 7:
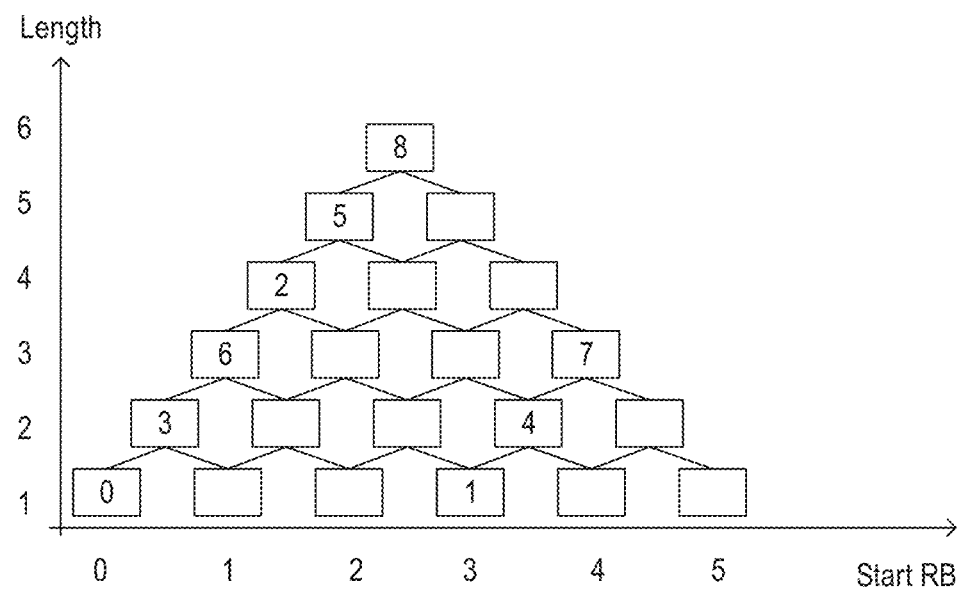

In some exemplary embodiments (also referred to herein as "Method 1a"), the RIV is defined such that it supports all possible allocation lengths ($L_{RBs}=1, 2, \ldots, N_{BWP}^{size}$), and the resolution (or granularity) for starting virtual resource block $RB_{start}$ is $\alpha$ RBs. FIGS. 6 and 7 illustrate examples of the RIV encoding according to Method 1a for $\alpha=2$ and 3, respectively.

RIV encoding according to the exemplary embodiments of Method 1a can be determined as follows:

Assuming $RB_{start}=\{0, \alpha, 2\alpha, \ldots, (\lfloor N_{BWP}^{size}/\alpha \rfloor - 1)\alpha\}$ and $L_{RBs}=\{1, 2, \ldots, N_{BWP}^{size}\}$, define:
$RB_{start}' = RB_{start}/\alpha$,
$L_{RBs}' = \lfloor L_{RBs}/\alpha \rfloor + 1$,
$k = (L_{RBs}-1) \bmod \alpha \rightarrow k = \{0, 1, \ldots, \alpha-1\}$
$N'_{BWP}{}^{size} = \lfloor N_{BWP}^{size}/\alpha \rfloor$ RIV can then be determined according to:

if $(L_{RBs}'-1) <= \lfloor N'_{BWP}{}^{size}/2 \rfloor$ then $RIV = N'_{BWP}{}^{size}(L_{RBs}'-1) + RB_{start}' + k*(N'_{BWP}{}^{size}+1) * N'_{BWP}{}^{size}/2$ else $RIV = N'_{BWP}{}^{size}(N'_{BWP}{}^{size} - L'_{RBs}+1) + (N'_{BWP}{}^{size}-1-RB_{start}') + k*(N'_{BWP}{}^{size}+1) * N'_{BWP}{}^{size}/2$ Also according to the exemplary embodiments of Method 1a, the value of $\alpha$ can be determined by equations (1) and (2) below. The number of encoded RIVs, M, is $$M = \alpha(\lfloor N_{BWP}^{size}/\alpha \rfloor + 1) * (\lfloor N_{BWP}^{size}/\alpha \rfloor)/2, \quad (1)$$

and if the number of bits for signaling RIV is b, then the following must be satisfied:

$$b = \lceil \log_2 M \rceil \quad (2)$$

Given a value of b, the resolution for starting virtual resource block ($RB_{start}$) in terms of number of RBs ($\alpha$) can be determined by using equation (1) and (2). For example, if the number of bits for frequency allocation is b=4 bits for a BWP of $N_{BWP}^{size}=6$ RBs, then, the resolution of the starting RB should be designed to $\alpha=2$ as shown in FIG. 6. In another example, if the number of bits for frequency allocation is b=3 for the same BWP of $N_{BWP}^{size}=6$ RBs, then, the resolution of the starting RB should be $\alpha=3$ as shown in FIG. 7.

In other exemplary embodiments according to Method 1a, the value of $\alpha$ can be determined by $\alpha = \lceil (N_{BWP,1}^{size}/N_{BWP,2}^{size})^2 \rceil$, where $N_{BWP,1}^{size}$ is the size of the BWP to which apply the RIV, and $N_{BWP,2}^{size}$ is the size of the BWP used to define the RIV size or the maximum size of the BWP that can be supported by the number of signaling bits used for frequency allocation.

Figure 8:
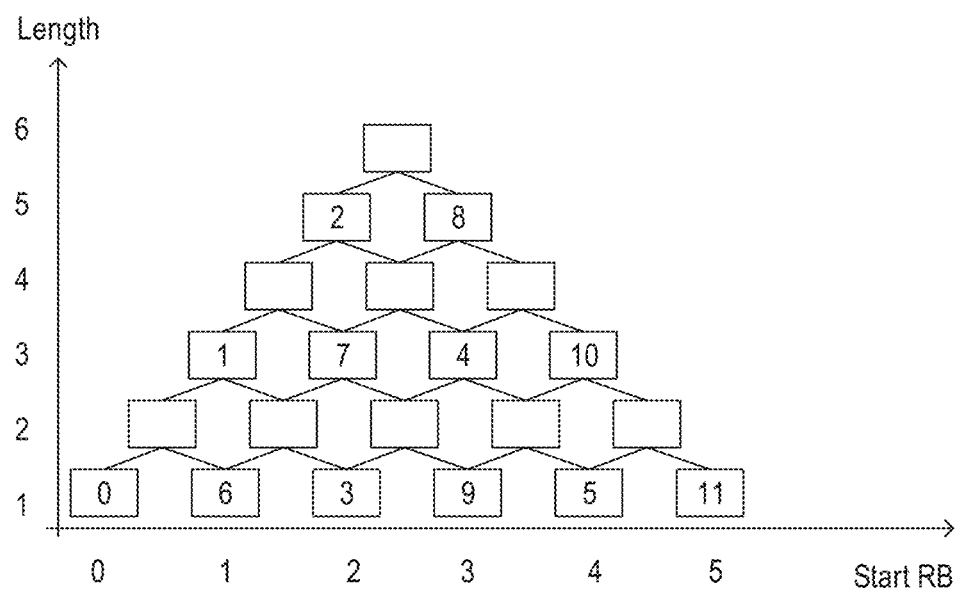
Figure 9:
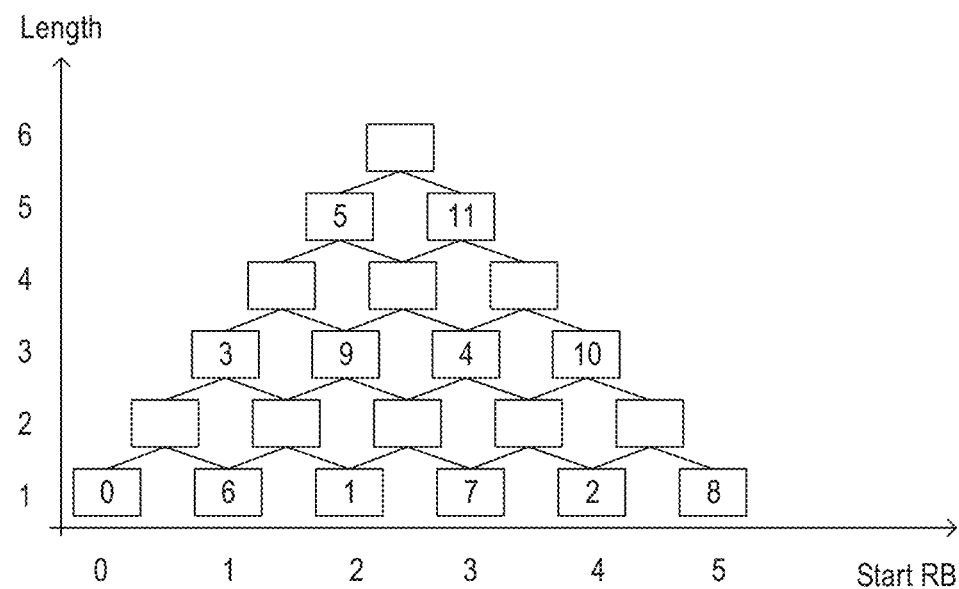

In other exemplary embodiments (also referred to herein as "Method 1b"), the RIV is defined such that it supports all possible starting virtual resource block ($RB_{start}=0, 1, \ldots, N_{BWP}^{size}$), and the resolution for allocation lengths is $\alpha$ RBs ($L_{RBs}=1, 1+\alpha, \ldots, \lfloor (N_{BWP}^{size}-1)/\alpha \rfloor \alpha+1)$. FIGS. 8 and 9 show two examples of different RIV encoding schemes based on method 1b when $N_{BWP}^{size}=6$ and $\alpha=2$.

In other exemplary embodiments (also referred to herein as "Method 2a"), the RIV is determined such that it supports flexible starting virtual resource block no greater than $N_{BWP}^{size}-L_{min}$ (i.e., $RB_{start}=0, 1, 2, \ldots, N_{BWP}^{size}-L_{min}$), and the length no less than $L_{min}$ (i.e., $L_{RBs}=L_{min}, L_{min}+1, \ldots, N_{BWP}^{size}$) with $1 \leq L_{min} \leq N_{BWP}^{size}$. FIG. 8 illustrates a manner of using 5 bits for encoding RIV, according to Method 2a, to support frequency domain resource allocation for a BWP with $N_{BWP}^{size}=8$ by using $L_{min}=3$. This case is overlaid in FIG. 8 with the encoding for the case of $N_{BWP}^{size}=6/L_{min}=1$. RIV encoding according to the exemplary embodiments of Method 2a can be determined as follows. Assuming $RB_{start}=\{0, 1, 2, \ldots, L_{min}\}$ and $L_{RBs}=\{L_{min}, L_{min}+1, \ldots, N_{BWP}^{size}\}$, define:
$L_{RBs}' = L_{RBs} - L_{min} + 1$,
$N'_{BWP}{}^{size} = N_{BWP}^{size} - L + 1$ RIV can then be determined according to:

if $(L'_{RBs}-1) <= \lfloor N'_{BWP}{}^{size}/2 \rfloor$ then $\text{RIV}=N'_{BWP}{}^{size}(L_{RBs}'-1)+RB_{start}$ else $\text{RIV}=N'_{BWP}{}^{size}(N'_{BWP}{}^{size}-L'_{RBs}+1)+(N'_{BWP}{}^{size}-1-RB_{start})$ Also according to the to the exemplary embodiments of Method 2a, the value of $L_{min}$ can be determined by equations (3)-(5) below. The number of encoded RIVs, M, is determined by:

$$M=(N_{BWP}{}^{size}-L_{min}+1)*(N_{BWP}{}^{size}-L_{min}+2)/2 \quad (3)$$

Assuming that the number of bits available for signaling RIV is b, then, the following relation must be satisfied:

$$b=\lceil \log_2 M \rceil \quad (4)$$

As such, given a value of b, the value of $L_{min}$ can be determined by using eqs. (3) and (4):

$$L_{min} = N_{BWP}^{size} + \left\lceil \frac{3 - \sqrt{1+2^{b+3}}}{2} \right\rceil \quad (5)$$

In other exemplary embodiments (also referred to herein as "Method 2b"), the RIV is determined such that it supports flexible starting virtual resource block no greater than $N_{BWP,2}{}^{size}-1$ (i.e., $RB_{start}=0, 1, \ldots, N_{BWP,2}{}^{size}-1$), and the lengths is no greater than $L_{max}$ (i.e., $L_{RBs}=1, 2, \ldots, L_{max}$) with $1 \leq L_{max} \leq \min(N_{BWP,1}{}^{size}, N_{BWP,2}{}^{size})$, where $N_{BWP,1}{}^{size}$ is the size of the BWP to which apply the RIV, and $N_{BWP,2}{}^{size}$ is the size of the BWP used to define the RIV size or the maximum size of the BWP that can be supported by the number of signaling bits used for frequency allocation. FIG. 9 illustrates a manner of using 5 bits for encoding RIV, according to Method 2b, to support frequency domain resource allocation for a BWP with $N_{BWP}{}^{size}=8$ by using $L_{max}=6$. This case is overlaid in FIG. 9 with encoding for the case of $N_{BWP}{}^{size}=6/L_{max}=6$.

RIV encoding according to the exemplary embodiments of Method 2b can be determined as follows. Assuming $RB_{start}=\{0, 1, 2, \ldots, N_{BWP}{}^{size}-1\}$ and $L_{RBs}=\{1, 2, \ldots, L_{max}\}$, define $N'_{BWP}{}^{size}=N_{BWP,2}{}^{size}$. RIV can then be determined according to:

if $(L_{RBs}-1) <= \lfloor N'_{BWP}{}^{size}/2 \rfloor$ then $\text{RIV}=N'_{BWP}{}^{size}(L_{RBs}-1)+RB_{start}$ else $\text{RIV}=N_{BWP}{}^{size}(N'_{BWP}{}^{size}-L_{RBs}+1)+(N'_{BWP}{}^{size}-1-RB_{start})$ Also according to the exemplary embodiments of Method 2b, a value of $L_{max}$ can be determined by equations (6)-(8) below. The number of encoded RIVs, M, is determined by:

$$M=N'_{BWP}{}^{size}(N'_{BWP}{}^{size}+1)/2 \quad (6)$$

Assuming that the number of bits available for signaling RIV is b, then, the following relation must be satisfied:

$$b=\lceil \log_2 M \rceil \quad (7)$$

As such, given a value of b, the value of $L_{min}$ can be determined by using eqs. (6) and (7):

$$L_{max} = \left\lfloor \frac{\sqrt{1+2^{b+3}}-1}{2} \right\rfloor \quad (8)$$

In other exemplary embodiments (also referred to herein as "Method 3"), the RIV is determined according to resource allocation type 1 in LTE, but different puncturing patterns are configured to exclude a set of combinations of $RB_{start}$ and $L_{RBs}$. Various examples pertaining to Method 3 are given below, but these are intended only to aid in explanation and understanding of the principles related to Method 3, and are not intended to be limiting.

In one exemplary embodiment, a puncturing pattern configuration field for indicating the positions of the truncating/padding bits when applying standard RIV encoding can be included in the signalling for frequency-domain resource allocation. For example, the currently-defined maximum number of 275 PRBs, for NR, requires 16 bits to represent a RIV value using the legacy/existing type 1 encoding for assignment of frequency-domain resources, illustrated in FIG. 5. If 12 bits are used instead for frequency domain resource assignment in a BWP configured with 275 RBs, then four of the 16 bits can be punctured in various arrangements.

In one such exemplary puncturing arrangement, the two most significant bits of the 12 bits can be used for puncturing pattern indication. For example, these bits can indicate various patterns such as inserting x=4 (e.g., x=16-12) most significant bits with value set to '0' after y bits, and interpret the expanded resource block assignment according to standard SIV method. The value of y can depend on the value of the two pattern indication bits. For example, y=2, 4, 8, 12 can correspond to patterns 1, 2, 3, and 4, respectively, indicated by the two most significant bits.

pattern 1, 0000 00XX XXXX XXXX
pattern 2, 01XX 0000 XXXX XXXX
pattern 3, 10XX XXXX 0000 XXXX
pattern 4, 11XX XXXX XXXX 0000

In another example, the puncturing can be a predefined pattern, e.g. the x=4 MSB with value set to zeros are always inserted after y=12 bits; In this case, the predefined pattern is XXXX XXXX XXXX 0000. In another example, the $N_{hop}$ most significant bits of the 12 frequency allocation bits can be used for frequency hopping indication. The puncturing pattern indication bits can be indicated by the 2 bits after the $N_{hop}$ frequency hopping bits. Padding bits are inserted after y bits, where the value of y is based on both the hopping bits and the puncturing pattern indication bits. If the puncturing pattern is predefined or configured by higher layers, then no bits are needed (in DCI) to indicate puncturing pattern, and the value of y can depend on the predefined puncturing pattern and the number of bits for frequency hopping indication.

In other exemplary embodiments corresponding to Method 3, the pattern indication can depend on other known parameters, e.g. the range of bandwidth part size. Likewise, the pattern indication bits can be provided to the UE in various ways including, for example: broadcast system information messages (e.g., SIB1); UE-specific Radio Resource Control (RRC) messages that can overwrite existing indication that were predefined or provided in SIB messages; in other reserved fields or code points in the scheduling DCI or RAR message.

In other exemplary embodiments (also referred to herein as "Method 4"), the RIV is determined according to a starting virtual resource block ($RB_{start}$) (e.g., similar to Method 1a) or according to allocation length $L_{RBs}$ (e.g., similar to Method 1b). However, exemplary embodiments according to Method 4 differ from exemplary embodiments according to Methods 1a/1b in that the RIV is encoded by using the existing standard RIV encoding based on the BWP which defines the RIV size.

More generally, in Method 4, a frequency domain resource assignment field can be encoded to a RIV corresponding to: 1) a starting virtual resource block ($RB_{start}$) with a resolution of $K_S$ RBs; and 2) a length ($L_{RBs}$) of virtually contiguously allocated resource blocks with a resolution of $K_L$ RBs. The RIV can be encoded based on existing standard RIV encoding according to a BWP that defines the frequency domain resource assignment field size. In the following explanatory but non-limiting examples, the frequency-domain resource assignment field is assumed to have a size of b bits and to be applied for a first BWP with $N_{BWP,1}^{size}$ RBs. For example, the first BWP can be an active BWP for the UE. The size, b, corresponds to a second BWP with $N_{BWP,2}^{size}$ RBs, i.e., $b=\lceil \log_2(N_{BWP,2}^{size}(N_{BWP,2}^{size}+1)/2) \rceil$. For example, the second BWP can be a BWP other than the active BWP, such as an initial BWP for the UE.

In one group of exemplary embodiments of Method 4, the quantized values of $RB_{start}$ start from 0 and the quantized values of $L_{RBs}$ start from $K_L$. In other words, RIV encoding is such that an encoded RIV corresponds to a starting virtual resource block $RB_{start}=(0, K_S, 2K_S, \ldots, RB_{start,max})$ and $L_{RBs}=(K_L, 2K_L, \ldots, L_{RBs,max})$, with $$RB_{start,max}=\min((N_{BWP,2}^{size}-1)\times K_S, (\lfloor N_{BWP,1}^{size}/K_S \rfloor) \times K_S), \text{ and}$$

$$L_{RBs,max}=\min(N_{BWP,2}^{size} \times K_L, \lfloor N_{BWP,1}^{size}/K_L \rfloor \times K_L).$$

Figure 10:
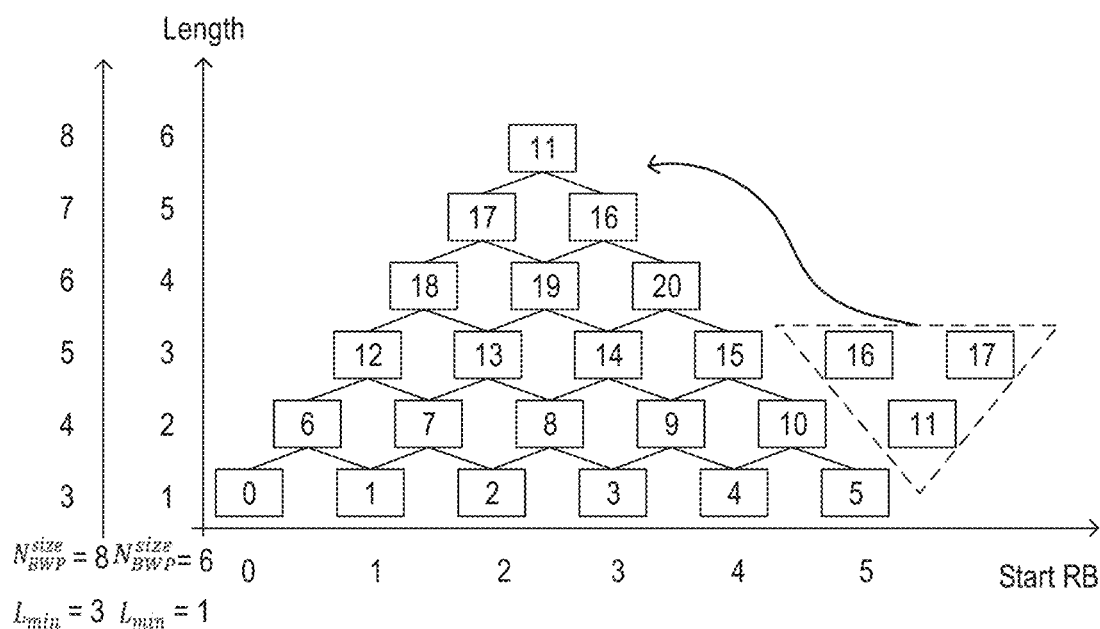

An example is shown in FIG. 10, where four (4) bits are allocated for signaling of frequency domain resource assignment in an initial BWP configured with five (5) RBs. The RIV can be encoded according to the initial BWP based on the standard encoding method. To use four bits for frequency domain resource assignment in another BWP configured with six (6) RBs, a resolution of two (2) RBs can be introduced to the starting virtual resource block. The RIV nodes 1, 2, 3, and 13 in FIG. 10 are invalid values, i.e., they cannot be used for frequency assignment in the BWP with 6 RBs.

Figure 11:
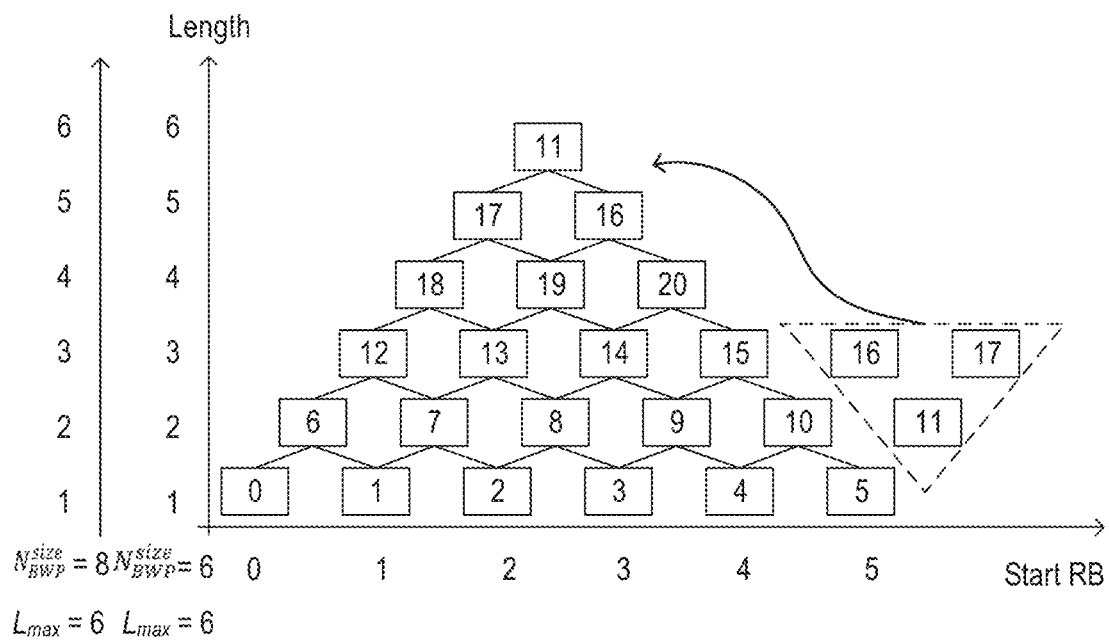
Figure 12:
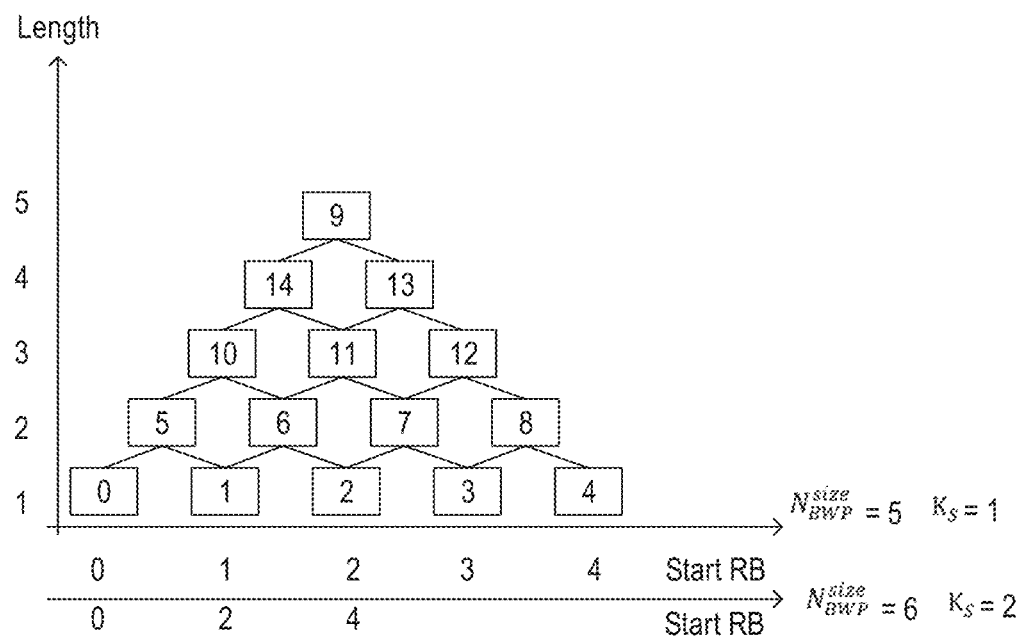
Figure 13:
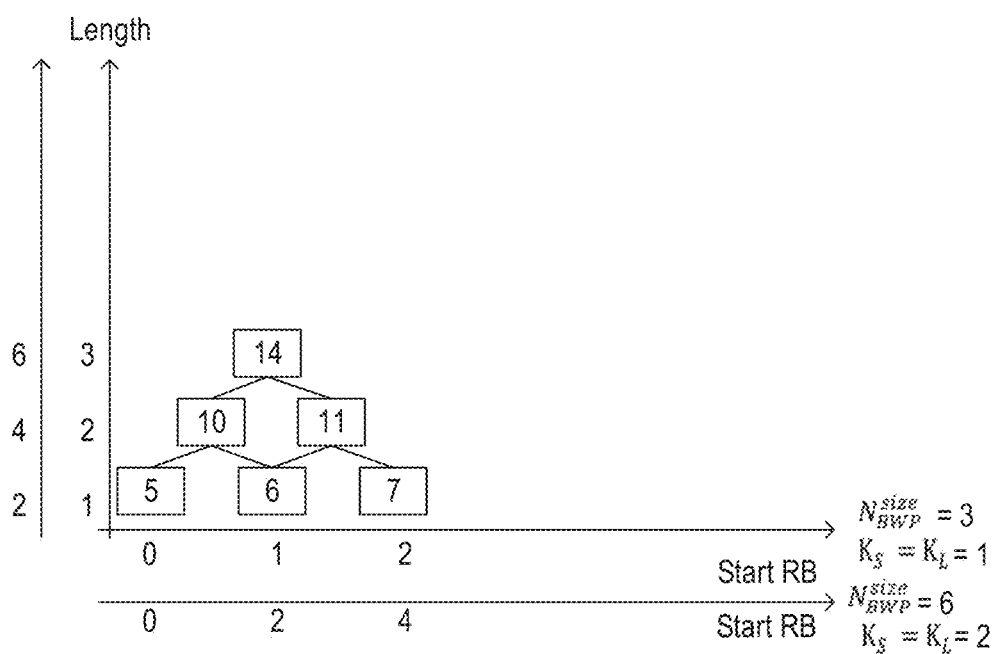

FIG. 11 shows another example where the RIV is encoded according to a BWP of three (3) RBs based on the standard encoding method. The resulting starting virtual RB and length are multiplied by a factor of 2 when applied to the frequency allocation for another BWP of six (6) RBs.

RIV encoding according to the above-described exemplary embodiments of Method 4 can be determined as follows. Assuming $RB'_{start}=RB_{start}/K_S$ and $L'_{RBs}=L_{RBs}/K_L$. RIV can then be determined according to:

If $1 \leq L_{RBs} \leq N'_{BWP}^{size}-RB'_{start}$, then if $(L'_{RBs}-1) \leq \lfloor N_{BWP}^{size}/2 \rfloor$ then RIV=$N'_{BWP}^{size}(L'_{RBs}-1)+RB'_{start}$ else RIV=$N'_{BWP}^{size}(N'_{BWP}^{size}-L'_{RBs}+1)+(N'_{BWP}^{size}-1-RB'_{start})$ else RIV=Invalid end Furthermore, $K_S$ and $K_L$ can then be determined (for all integer values $\geq 1$) in various ways for this group of exemplary embodiments of Method 4, based on the following definitions:

$$RB_{start,max}=\min((N_{BWP,2}^{size}-1) \times K_S, (\lfloor N_{BWP,1}^{size}/K_S \rfloor -1) \times K_S)$$

$$L_{RBs,max}=\min(N_{BWP,2}^{size} \times K_L, \lfloor N_{BWP,1}^{size}/K_L \rfloor \times K_L)$$

Nevertheless, when $N_{BWP,2}^{size} \lfloor N_{BWP,1}^{size}/K_S \rfloor$ or/and $N_{BWP,2}^{size} < \lfloor N_{BWP,1}^{size}/K_L \rfloor$, some possible quantized values of $RB_{start}$ and $L_{RBs}$ may not be supported. Moreover, it is possible to optimize the values of $K_S$ and $K_L$ to make efficient use of the b signaling bits, and at the same time provide the required flexibility frequency domain resource assignment.

In some exemplary embodiments corresponding to Method 4, the value(s) of $K_S$ and/or $K_L$ can be determined based on the ratio between $N_{BWP,1}^{size}$ and $N_{BWP,2}^{size}$. For example, if $K_S=K_L=K$, then, $K=f(N_{BWP,1}^{size}/N_{BWP,2}^{size})$, where the function f(.) can be floor, ceiling, round to the closest integer, or any other function that can be employed to provide an appropriate and/or desirable result.

In other exemplary embodiments corresponding to Method 4, if $K_L=1$ is required (e.g., for PUSCH or PDSCH transmissions with small payload sizes), then the value of $K_S$ can be determined based on $f((N_{BWP,1}^{size}/N_{BWP,2}^{size})^2)$, where the function f(.) can be floor, ceiling, round to the closest integer, or any other function that can be employed to provide an appropriate and/or desirable result. Similarly, if $K_S=1$, then, the value of $K_L$ is determined based on $f((N_{BWP,1}^{size}/N_{BWP,2}^{size})^2)$.

In other exemplary embodiments corresponding to Method 4, $K_L=K_S=K$, and the value of K can be determined as follows. If all quantized allocation possibilities are supported then, the number of encoded RIVs, M, is determined by:

$$M=(\lfloor N_{BWP,1}^{size}/K \rfloor +1)*(\lfloor N_{BWP,1}^{size}/K \rfloor)/2 \quad (9)$$

Assuming that the number of bits available for signaling RIV is b, then, the following relation must be satisfied:

$$b=\lceil \log_2 M \rceil \quad (10)$$

As such, given a value of b, the resolution for starting virtual resource block and the length in terms of number of RBs, K, can be derived by using equation (9) and (10). Although in the above it has been assumed the down sampling starts $RB_{start}=0$ and $L_{RBs}=K_L$, different offset values can be used, leading to slightly different values/equations.

In other exemplary embodiments corresponding to Method 4, $K_L=K_S=1$ if the ratio between $N_{BWP,1}^{size}$ and $N_{BWP,2}^{size}$ is below a particular threshold. For example, if:

$$\lceil \log_2(N_{BWP,1}^{size}(N_{BWP,1}^{size}+1)/2) \rceil - \lceil \log_2(N_{BWP,2}^{size}(N_{BWP,2}^{size}+1)/2) \rceil < 1,$$

then, $K_S=K_L=1$. For larger BWP, this can be approximated to:

if $N_{BWP,1}^{size}/N_{BWP,2}^{size} < \sqrt{1/2}$, then $K_S=K_L=1$, where the particular threshold in this case is $\sqrt{1/2}$.

In other exemplary embodiments corresponding to Method 4, $K_L=K_S=1$ if the difference between $N_{BWP,1}^{size}$ and $N_{BWP,2}^{size}$ is below a certain threshold.

In another group of exemplary embodiments of Method 4, the quantized values of $RB_{start}$ start from 0 and the quantized values of $L_{RBs}$ start from $L_{RBs}^{offset}$. In other words, the RIV encoding is such that an encoded RIV corresponds to a starting virtual resource block $RB_{start}=(0, K_S, 2K_S, \ldots, RB_{start,max})$ with $L_{RBs}=(L_{RBs}^{offset}, K_L+L_{RBs}^{offset}, 2K_L+L_{RBs}^{offset}, \ldots, L_{RBs,max})$, with $1 \le L_{RBs}^{offset} < K_L$, and the maximum values represented as:

$$RB_{start,max}=\min((N_{BWP,2}^{size}-1)\times K_S, (\lfloor N_{BWP,1}^{size}/K_S \rfloor ) \times K_S)$$

$$L_{RBs,max}=\min(N_{BWP,2}^{size} \times K_L, \lfloor (N_{BWP,1}^{size}-L_{RBs}^{offset})/K_L \rfloor \times K_L + L_{RBs}^{offset})$$

RIV encoding according to the above-described exemplary embodiments of Method 4 can be determined as follows. Assuming $N'_{BWP}{}^{size}=N_{BWP,2}{}^{size}$, $$RB'_{start} = \frac{RB_{start}}{K_S},$$

and $L'_{RBs}=(L_{RBs}-L_{RBs}^{offset})/K_L+1$, RIV can then be determined according to:

If $1 \le L'_{RBs} \le N'_{BWP}{}^{size}-RB'_{start}$, then if $(L'_{RBs}-1) <= \lfloor N'_{BWP}{}^{size}/2 \rfloor$ then $RIV=N'_{BWP}{}^{size}(L'_{RBs}-1)+RB'_{start}$ else $RIV=N'_{BWP}{}^{size}(N'_{BWP}{}^{size}-L'_{RBs}+1)+(N'_{BWP}{}^{size}-1-RB'_{start})$ Else RIV=Invaild end Furthermore, $K_S$ and $K_L$ can then be determined (for all integer values $\ge 1$) in various ways for this group of exemplary embodiments of Method 4, based on the following definitions:

$$RB_{start,max}=\min((N_{BWP,2}^{size}-1)\times K_S,(\lfloor N_{BWP,1}^{size}/K_S \rfloor -1) \times K_S)$$

$$L_{RBs,max}=\min(N_{BWP,2}^{size} \times K_L, \lfloor (N_{BWP,1}^{size}-L_{RBs}^{offset})/K_L \rfloor \times K_L + L_{RBs}^{offset})$$

Nevertheless, when $N_{BWP,2}{}^{size} < \lfloor N_{BWP,1}{}^{size}/K_S \rfloor$ or/and $N_{BWP,2}{}^{size} < \lfloor N_{BWP,1}{}^{size}/K_L \rfloor$, some possible quantized values of $RB_{start}$ and $L_{RBs}$ may not be supported.

For example, in one embodiment corresponding to Method 4, $K_L=K_S=K$, and the value of K can be determined as follows. If all quantized allocation possibilities are supported then, the number of encoded RIVs (M) is determined by:

$$M=(N'+1)*(N')/2 \quad (11)$$

where $N'=\max(\lfloor N_{BWP,1}{}^{size}/K \rfloor, \lfloor (N_{BWP,1}{}^{size}-L_{RBs}^{offset})/K \rfloor +1)$. Assuming that the number of bits available for signaling RIV is b, then the following relation must be satisfied:

$$b = \lceil \log_2 M \rceil \quad (12)$$

As such, given a value of b, the resolution for starting virtual resource block and the length in terms of number of RBs, K, can be derived by using equations (11) and (12). For this group of embodiments of Method 4, $K_S$ and $K_L$ can also be determined in other ways to make efficient use of the b signaling bits and at the same time provide the required flexibility frequency domain resource assignment, including those discussed above in relation to the other group of embodiments of Method 4.

Furthermore, $K_S$ and $K_L$ can also be determined, according to this group of embodiments, in various ways based on the time-domain assignment of resources to the UE. In one example, $K_L=K_S=K$ and the value of K can be determined by $K=\lfloor \alpha N_{BWP,1}{}^{size}/N_{BWP,2}{}^{size} \rfloor$, where $N_{BWP,1}{}^{size}$ is the size of the BWP where the frequency allocation applies; $N_{BWP,2}{}^{size}$ is the size of the BWP used to define the RIV size or the maximum size of the BWP that can be supported by the number of signaling bits used for frequency allocation assuming one slot time resource allocation (i.e., 14 OFDM symbols);

$$\alpha = f\left(\frac{14}{T}\right),$$

where T is the time resource allocation in terms of number of OFDM symbols; and the function f(.) can be floor, ceiling, round to the closest integer, or any other function that can be employed to provide an appropriate and/or desirable result.

In another example, $K_L=1$ and the value of $K_S$ can be determined according to the same or substantially similar methods for determining the value of a discussed above in relation to Method 1a, e.g., $K_S=\lfloor (\alpha N_{BWP,1}{}^{size}/N_{BWP,2}{}^{size})^2 \rfloor$. In another example, $K_S=1$ and the value of $K_L$ can be determined according to the same or substantially similar methods for determining the value of a discussed above in relation to Method 1a, e.g., $K_L=\lfloor (\alpha N_{BWP,1}{}^{size}/N_{BWP,2}{}^{size})^2 \rfloor$. In another example, if $\alpha N_{BWP,1}{}^{size}-N_{BWP,2}{}^{size}$ is smaller than a threshold, then $K_L=K_S=1$.

The above examples of encoding frequency-domain resource allocations for NR are given for purposes of explanation and without limitation. Other approaches and/or variations consistent with the above description can easily be envisioned by a person of ordinary skill in the art. For example, a skilled person would readily comprehend that one of more combinations of the above encoding techniques could be employed. Likewise, a skilled person would also readily comprehend that various additive and/or multiplicative scaling factors could be used in the above encoding methods. For example, scaling factor(s) could be applied to the starting virtual resource block and/or the allocation length prior to performing an encoding according to one (or a combination) of the techniques discussed above. Furthermore, although embodiments have been described above in terms of a first (e.g., active) BWP and a second (e.g., initial) BWP, and how to define RIV encoding for the second BWP using RIV size of a first BWP, such embodiments can be applied to solve more general problems related to encoding of a RIV for a second BWP using a first RIV size value, where the first RIV size value is not a "natural" RIV size of the second BWP.

Figure 14:
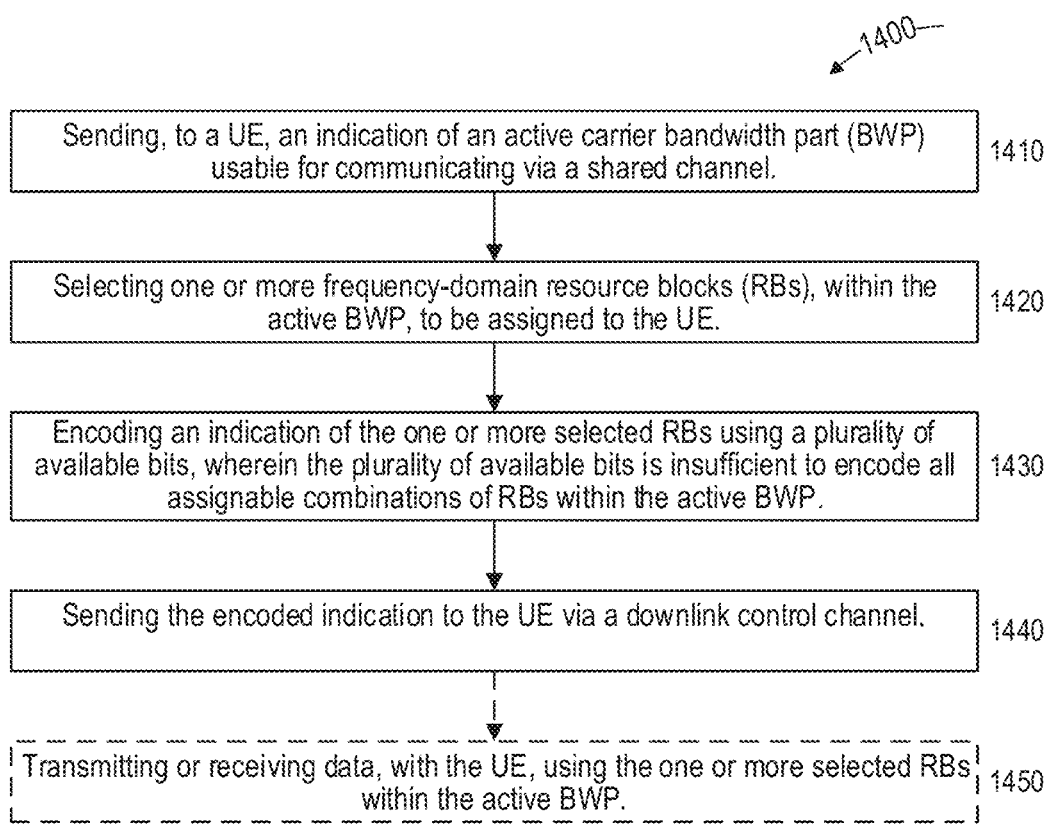
FIG. 14 shows a flow diagram of an exemplary method and/or procedure for a network node (e.g., base station, gNB, eNB, en-gNB, ng-eNB, etc., or component thereof), according to various exemplary embodiments of the present disclosure.

By more efficient use of the bits available for signalling resource assignments, these and other exemplary embodiments can improve the usage efficiency of physical downlink control channels (PDCCH) in NR, resulting in improvements to the latency of shared resource assignment and in the number of UEs that can utilize a particular PDCCH resource. Such improvements can be manifested as improved end-user performance and/or quality of user experience. Other exemplary benefits include reduced hardware requirements (e.g., fewer processors and memories), which can reduce network deployment cost and reduce environ- FIG. 14 illustrates an exemplary method and/or procedure for assigning, to a user equipment (UE), frequency-domain resources of a communication channel shared with one or more further UEs, in accordance with various exemplary embodiments of the present disclosure. The exemplary method and/or procedure can be performed by a network node (e.g., base station, gNB, eNB, en-gNB, ng-eNB, etc., or component thereof) in a wireless communication network.

Figure 15:
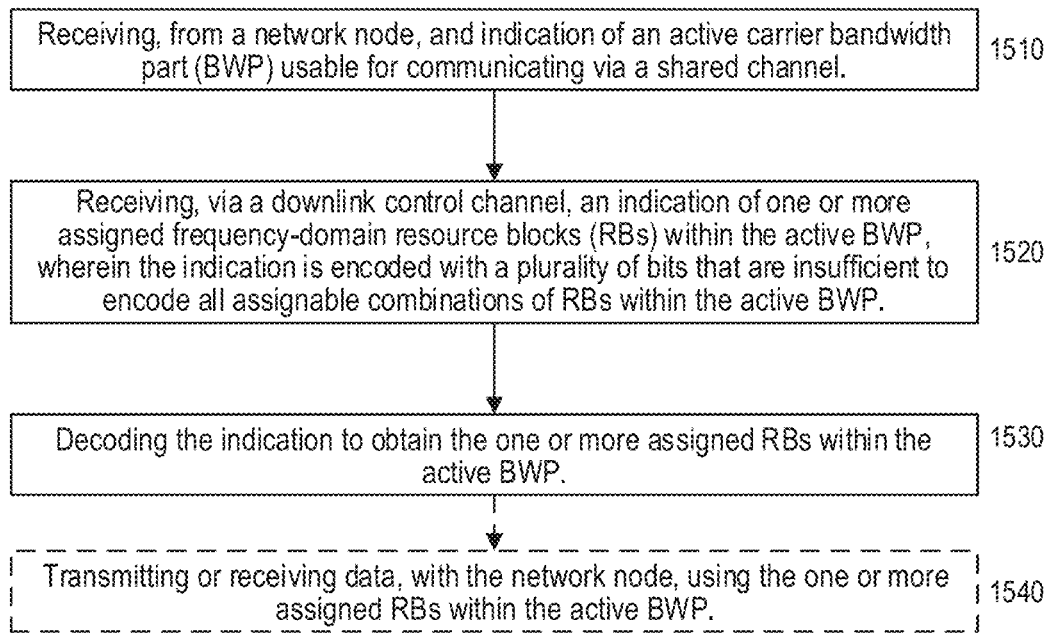
FIG. 15 shows a flow diagram of an exemplary method and/or procedure for a user equipment (UE, e.g., wireless device, IoT device, modem, etc., or component thereof), according to various exemplary embodiments of the present disclosure.

Although FIG. 14 shows blocks arranged in a particular order, this order is exemplary and the operations corresponding to the blocks can be performed in different orders, and can be combined and/or divided into blocks having different functionality than shown in FIG. 14. Furthermore, the exemplary method and/or procedure shown in FIG. 14 can be complementary to the exemplary method and/or procedure shown in FIG. 15. In other words, exemplary methods and/or procedures shown in FIGS. 14 and 15 are capable of being used cooperatively to provide the benefits, advantages, and/or solutions to problems described herein above. Optional operations are indicated by dashed lines.

The exemplary method and/or procedure can include the operations of block 1410, where the network node can send, to the UE, an indication of an active carrier bandwidth part (BWP) usable for communicating via the shared channel In some exemplary embodiments, the active BWP can be one of a plurality of BWPs configured for use by the UE. The exemplary method and/or procedure can also include the operations of block 1420, where the network node can select one or more frequency-domain resource blocks (RBs) within the active BWP, to be assigned to the UE. The exemplary method and/or procedure can also include the operations of block 1430, where the network node can encode an indication of the one or more selected RBs using a plurality of available bits, wherein the plurality of available bits is insufficient to encode all assignable combinations of RBs within the active BWP. The exemplary method and/or procedure can also include the operations of block 1440, where the network node can send the encoded indication to the UE via a downlink control channel In some embodiments, the exemplary method and/or procedure can also include the operations of block 1450, in which the network node can transmit or receive data, to or from the UE, using the one or more selected RBs within the active BWP.

In some embodiments, the plurality of available bits can be less than $\lceil \log_2(N_{BWP,1}^{size}(N_{BWP,1}^{size}+1)/2) \rceil$, where $N_{BWP,1}^{size}$ is the number of RBs in the active BWP. In some embodiments, the one or more assigned RBs can be represented by a starting virtual resource block, $RB_{start}$, and a length of contiguously allocated resource blocks, $L_{RBs}$. In some embodiments, the starting virtual resource block, $RB_{start}$, can be encoded with a resolution of $K_S$ RBs and the length of contiguously allocated resource blocks, $L_{RBs}$, can be encoded with a resolution of $K_L$ RBs. In some embodiments, $K_S$ can be equal to $K_L$. In some embodiments, the indicator can be encoded such that the minimum value of $RB_{start}$ that the indicator can represent is zero, and the minimum value of $L_{RBs}$ that the indicator can represent is $K_L$.

In some embodiments, the active BWP comprises $N_{BWP,1}^{size}$ RBs and the plurality of available bits is determined based on the number of RBs, $N_{BWP,2}^{size}$, of a BWP other than the active BWP (e.g., an initial BWP). In some embodiments, at least one of $K_S$ and $K_L$ can be determined based on a function of the ratio of $N_{BWP,1}^{size}$ divided by $N_{BWP,2}^{size}$. In some embodiments, the function can be floor, ceiling, or round. In some embodiments, both $K_S$ and $K_L$ can be determined to be equal to one if the function of the ratio of $N_{BWP,1}^{size}$ divided by $N_{BWP,2}^{size}$ is below a particular threshold.

In some embodiments, the indicator can be encoded according to:

$$N'_{BWP}{}^{size}(L'_{RBs}-1)+RB'_{start}, \text{ if } (L'_{RBs}-1) \leq \lfloor N'_{BWP}{}^{size}/2 \rfloor; \text{ and}$$

$$N'_{BWP}{}^{size}(N'_{BWP}{}^{size}-L'_{RBs}+1)+(N'_{BWP}{}^{size}-1-RB'_{start})$$
otherwise, where $N'_{BWP}{}^{size}=N_{BWP,2}{}^{size}$, $RB_{start}'=RB_{start}/K_S$ and $L_{RBs}'=L_{RBs}/K_L$.

FIG. 15 illustrates an exemplary method and/or procedure, performed by a user equipment (UE), for receiving an assignment of frequency-domain resources of a communication channel shared with one or more further UEs, in accordance with particular exemplary embodiments of the present disclosure. The exemplary method and/or procedure can be performed by a user equipment (UE, e.g., wireless device, IoT device, modem, etc., or component thereof) in communication with a network node (e.g., base station, gNB, eNB, en-gNB, ng-eNB, etc., or component thereof) in a wireless communication network.

Although FIG. 15 shows blocks arranged in a particular order, this order is exemplary and the operations corresponding to the blocks can be performed in different orders, and can be combined and/or divided into blocks having different functionality than shown in FIG. 15. Furthermore, the exemplary method and/or procedure shown in FIG. 15 can be complementary to the exemplary method and/or procedure illustrated in FIG. 14. In other words, the exemplary methods and/or procedures shown in FIGS. 14-15 are capable of being used cooperatively to provide the benefits, advantages, and/or solutions to problems described herein above. Optional operations are indicated by dashed lines.

The exemplary method and/or procedure can include the operations of block 1510, where the UE can receive, from a network node in a wireless communication network, an indication of an active carrier bandwidth part (BWP) usable for communicating via the shared channel. In some embodiments, the active BWP can be one of a plurality of BWPs configured for use by the UE. The exemplary method and/or procedure can also include the operations of block 1520, where the UE can receive, via a downlink control channel from the network node, an indication of one or more assigned frequency-domain resource blocks (RBs) within the active BWP, wherein the indication is encoded with a plurality of bits that are insufficient to encode all assignable combinations of RBs within the active BWP. The exemplary method and/or procedure can also include the operations of block 1530, where the UE can decode the received indication to obtain the one or more assigned RBs within the active BWP. In some embodiments, the exemplary method and/or procedure can also include the operations of block 1540, in which the UE can transmit or receive data, to or from the network node, using the one or more assigned RBs within the active BWP.

In some embodiments, the plurality of available bits can be less than $\lceil \log_2(N_{BWP,1}^{size}(N_{BWP,1}^{size}+1)/2) \rceil$, where $N_{BWP,1}^{size}$ is the number of RBs in the active BWP. In some embodiments, the one or more assigned RBs can be represented by a starting virtual resource block, $RB_{start}$, and a length of contiguously allocated resource blocks, $L_{RBs}$. In some embodiments, the starting virtual resource block, $RB_{start}$, can be encoded with a resolution of $K_S$ RBs and the length of contiguously allocated resource blocks, $L_{RBs}$, can be encoded with a resolution of $K_L$ RBs. In some embodiments, $K_S$ can be equal to $K_L$. In some embodiments, the indicator can be encoded such that the minimum value of $RB_{start}$, that the indicator can represent is zero, and the minimum value of $L_{RBs}$ that the indicator can represent is $K_L$.

In some embodiments, the active BWP comprises $N_{BWP,1}^{size}$ RBs and the plurality of available bits is determined based on the number of RBs, $N_{BWP,2}^{size}$, of a BWP other than the active BWP (e.g., an initial BWP). In some embodiments, at least one of $K_S$ and $K_L$ can be determined based on a function of the ratio of $N_{BWP,1}^{size}$ divided by $N_{BWP,2}^{size}$. In some embodiments, the function can be floor, ceiling, or round. In some embodiments, both $K_S$ and $K_L$ can be determined to be equal to one if the function of the ratio of $N_{BWP,1}^{size}$ divided by $N_{BWP,2}^{size}$ is below a particular threshold.

In some embodiments, the indicator can be encoded according to:

$$N'_{BWP}{}^{size}(L'_{RBs}-1)+RB'_{start}, \text{ if } (L'_{RBs}-1) \leq \lfloor N'_{BWP}{}^{size}/2 \rfloor; \text{ and}$$

$$N'_{BWP}{}^{size}(N_{BWP}{}^{size}-L'_{RBs}+1)+(N'_{BWP}{}^{size}-1-RB'_{start})$$
otherwise, where $N'_{BWP}{}^{size}=N_{BWP,2}^{size}$, $RB'_{start}=RB_{start}/K_S$ and $L'_{RBs}=L_{RBs}/K_L$.

Figure 16:
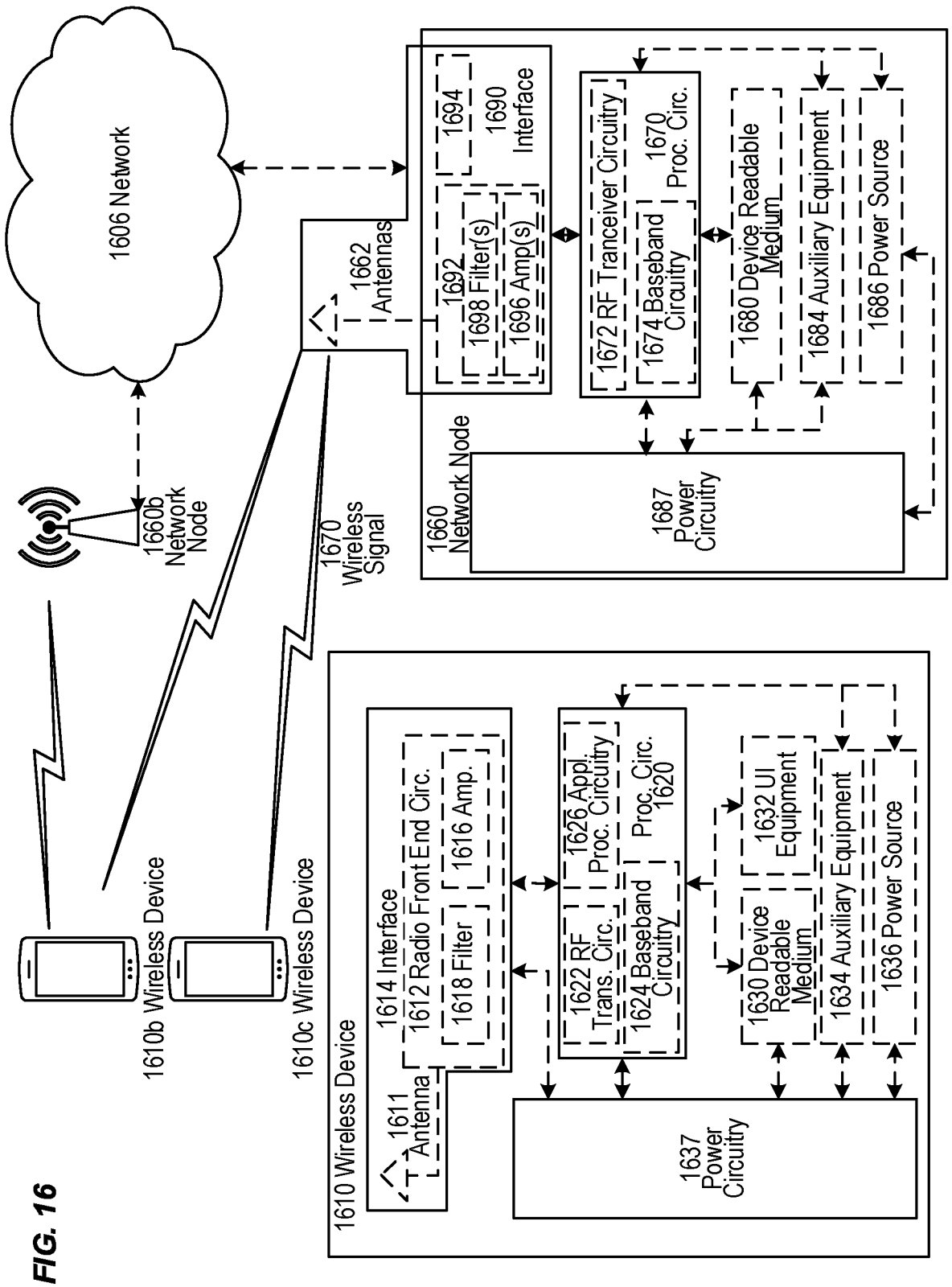
FIG. 16 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network can further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1660 are depicted as single boxes located within a larger box, or nested within multiple boxes, in practice, a network node can comprise multiple different physical components that make up a single illustrated component (e.g., device readable medium 1680 can comprise multiple separate hard drives as well as multiple RAM modules).

Similarly, network node 1660 can be composed of multiple physically separate components (e.g., a NodeB component and a RNC component, or a BTS component and a BSC component, etc.), which can each have their own respective components. In certain scenarios in which network node 1660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1660 can be configured to support multiple radio access technologies (RATs). In such embodiments, some components can be duplicated (e.g., separate device readable medium 1680 for the different RATs) and some components can be reused (e.g., the same antenna 1662 can be shared by the RATs). Network node 1660 can also include multiple sets of the various illustrated components for different wireless technologies integrated into network node 1660, such as, for example, GSM, WCDMA, LTE, NR, WiFi, or Bluetooth wireless technologies. These wireless technologies can be integrated into the same or different chip or set of chips and other components within network node 1660.

Processing circuitry 1670 can be configured to perform any determining, calculating, or similar operations (e.g., certain obtaining operations) described herein as being provided by a network node. These operations performed by processing circuitry 1670 can include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 can execute instructions stored in device readable medium 1680 or in memory within processing circuitry 1670. Such functionality can include providing any of the various wireless features, functions, or benefits discussed herein. In some embodiments, processing circuitry 1670 can include a system on a chip (SOC).

In some embodiments, processing circuitry 1670 can include one or more of radio frequency (RF) transceiver circuitry 1672 and baseband processing circuitry 1674. In some embodiments, radio frequency (RF) transceiver circuitry 1672 and baseband processing circuitry 1674 can be on separate chips (or sets of chips), boards, or units, such as radio units and digital units. In alternative embodiments, part or all of RF transceiver circuitry 1672 and baseband processing circuitry 1674 can be on the same chip or set of chips, boards, or units In certain embodiments, some or all of the functionality described herein as being provided by a network node, base station, eNB or other such network device can be performed by processing circuitry 1670 executing instructions stored on device readable medium 1680 or memory within processing circuitry 1670. In alternative embodiments, some or all of the functionality can be provided by processing circuitry 1670 without executing instructions stored on a separate or discrete device readable medium, such as in a hard-wired manner In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1670. Device readable medium 1680 can store any suitable instructions, data or information, including a computer program, software, an application including one or more of logic, rules, code, tables, etc. and/or other instructions capable of being executed by processing circuitry 1670 and, utilized by network node 1660. Device readable medium 1680 can be used to store any calculations made by processing circuitry 1670 and/or any data received via interface 1690. In some embodiments, processing circuitry 1670 and device readable medium 1680 can be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that can be coupled to, or in certain embodiments a part of, antenna 1662. Radio front end circuitry 1692 comprises filters 1698 and amplifiers 1696. Radio front end circuitry 1692 can be connected to antenna 1662 and processing circuitry 1670. Radio front end circuitry can be configured to condition signals communicated between antenna 1662 and processing circuitry 1670. Radio front end circuitry 1692 can receive digital data that is to be sent out to other network nodes or WDs via a wireless connection. Radio front end circuitry 1692 can convert the digital data into a radio signal having the appropriate channel and bandwidth parameters using a combination of filters 1698 and/or amplifiers 1696. The radio signal can then be transmitted via antenna 1662. Similarly, when receiving data, antenna 1662 can collect radio signals which are then converted into digital data by radio front end circuitry 1692. The digital data can be passed to processing circuitry 1670. In other embodiments, the interface can comprise different components and/or different combinations of components.

In certain alternative embodiments, network node 1660 may not include separate radio front end circuitry 1692, instead, processing circuitry 1670 can comprise radio front end circuitry and can be connected to antenna 1662 without separate radio front end circuitry 1692. Similarly, in some embodiments, all or some of RF transceiver circuitry 1672 can be considered a part of interface 1690. In still other embodiments, interface 1690 can include one or more ports or terminals 1694, radio front end circuitry 1692, and RF transceiver circuitry 1672, as part of a radio unit (not shown), and interface 1690 can communicate with baseband processing circuitry 1674, which is part of a digital unit (not shown).

Antenna 1662 can include one or more antennas, or antenna arrays, configured to send and/or receive wireless signals. Antenna 1662 can be coupled to radio front end circuitry 1690 and can be any type of antenna capable of transmitting and receiving data and/or signals wirelessly. In some embodiments, antenna 1662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1662 can be separate from network node 1660 and can be connectable to network node 1660 through an interface or port.

Antenna 1662, interface 1690, and/or processing circuitry 1670 can be configured to perform any receiving operations and/or certain obtaining operations described herein as being performed by a network node. Any information, data and/or signals can be received from a wireless device, another network node and/or any other network equipment. Similarly, antenna 1662, interface 1690, and/or processing circuitry 1670 can be configured to perform any transmitting operations described herein as being performed by a network node. Any information, data and/or signals can be transmitted to a wireless device, another network node and/or any other network equipment.

Power circuitry 1687 can comprise, or be coupled to, power management circuitry and can be configured to supply the components of network node 1660 with power for performing the functionality described herein. Power circuitry 1687 can receive power from power source 1686. Power source 1686 and/or power circuitry 1687 can be configured to provide power to the various components of network node 1660 in a form suitable for the respective components (e.g., at a voltage and current level needed for each respective component). Power source 1686 can either be included in, or external to, power circuitry 1687 and/or network node 1660. For example, network node 1660 can be connectable to an external power source (e.g., an electricity outlet) via an input circuitry or interface such as an electrical cable, whereby the external power source supplies power to power circuitry 1687. As a further example, power source 1686 can comprise a source of power in the form of a battery or battery pack which is connected to, or integrated in, power circuitry 1687. The battery can provide backup power should the external power source fail. Other types of power sources, such as photovoltaic devices, can also be used.

Alternative embodiments of network node 1660 can include additional components beyond those shown in FIG. 16 that can be responsible for providing certain aspects of the network node's functionality, including any of the functionality described herein and/or any functionality necessary to support the subject matter described herein. For example, network node 1660 can include user interface equipment to allow and/or facilitate input of information into network node 1660 and to allow and/or facilitate output of information from network node 1660. This can allow and/or facilitate a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 can include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies can be integrated into the same or different chips or set of chips as other components within WD 1610.

Antenna 1611 can include one or more antennas or antenna arrays, configured to send and/or receive wireless signals, and is connected to interface 1614. In certain alternative embodiments, antenna 1611 can be separate from WD 1610 and be connectable to WD 1610 through an interface or port. Antenna 1611, interface 1614, and/or processing circuitry 1620 can be configured to perform any receiving or transmitting operations described herein as being performed by a WD. Any information, data and/or signals can be received from a network node and/or another WD. In some embodiments, radio front end circuitry and/or antenna 1611 can be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and can be configured to condition signals communicated between antenna 1611 and processing circuitry 1620. Radio front end circuitry 1612 can be coupled to or a part of antenna 1611. In some embodiments, WD 1610 may not include separate radio front end circuitry 1612; rather, processing circuitry 1620 can comprise radio front end circuitry and can be connected to antenna 1611. Similarly, in some embodiments, some or all of RF transceiver circuitry 1622 can be considered a part of interface 1614. Radio front end circuitry 1612 can receive digital data that is to be sent out to other network nodes or WDs via a wireless connection. Radio front end circuitry 1612 can convert the digital data into a radio signal having the appropriate channel and bandwidth parameters using a combination of filters 1618 and/or amplifiers 1616. The radio signal can then be transmitted via antenna 1611. Similarly, when receiving data, antenna 1611 can collect radio signals which are then converted into digital data by radio front end circuitry 1612. The digital data can be passed to processing circuitry 1620. In other embodiments, the interface can comprise different components and/or different combinations of components.

Processing circuitry 1620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality can include providing any of the various wireless features or benefits discussed herein. For example, processing circuitry 1620 can execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry can comprise different components and/or different combinations of components. In certain embodiments processing circuitry 1620 of WD 1610 can comprise a SOC. In some embodiments, RF transceiver circuitry 1622, baseband processing circuitry 1624, and application processing circuitry 1626 can be on separate chips or sets of chips. In alternative embodiments, part or all of baseband processing circuitry 1624 and application processing circuitry 1626 can be combined into one chip or set of chips, and RF transceiver circuitry 1622 can be on a separate chip or set of chips. In still alternative embodiments, part or all of RF transceiver circuitry 1622 and baseband processing circuitry 1624 can be on the same chip or set of chips, and application processing circuitry 1626 can be on a separate chip or set of chips. In yet other alternative embodiments, part or all of RF transceiver circuitry 1622, baseband processing circuitry 1624, and application processing circuitry 1626 can be combined in the same chip or set of chips. In some embodiments, RF transceiver circuitry 1622 can be a part of interface 1614. RF transceiver circuitry 1622 can condition RF signals for processing circuitry 1620.

In certain embodiments, some or all of the functionality described herein as being performed by a WD can be provided by processing circuitry 1620 executing instructions stored on device readable medium 1630, which in certain embodiments can be a computer-readable storage medium. In alternative embodiments, some or all of the functionality can be provided by processing circuitry 1620 without executing instructions stored on a separate or discrete device readable storage medium, such as in a hard-wired manner In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 can be configured to perform any determining, calculating, or similar operations (e.g., certain obtaining operations) described herein as being performed by a WD. These operations, as performed by processing circuitry 1620, can include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 can be operable to store a computer program, software, an application including one or more of logic, rules, code, tables, etc. and/or other instructions capable of being executed by processing circuitry 1620. Device readable medium 1630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1620. In some embodiments, processing circuitry 1620 and device readable medium 1630 can be considered to be integrated.

User interface equipment 1632 can include components that allow and/or facilitate a human user to interact with WD 1610. Such interaction can be of many forms, such as visual, audial, tactile, etc. User interface equipment 1632 can be operable to produce output to the user and to allow and/or facilitate the user to provide input to WD 1610. The type of interaction can vary depending on the type of user interface equipment 1632 installed in WD 1610. For example, if WD 1610 is a smart phone, the interaction can be via a touch screen; if WD 1610 is a smart meter, the interaction can be through a screen that provides usage (e.g., the number of gallons used) or a speaker that provides an audible alert (e.g., if smoke is detected). User interface equipment 1632 can include input interfaces, devices and circuits, and output interfaces, devices and circuits. User interface equipment 1632 can be configured to allow and/or facilitate input of information into WD 1610, and is connected to processing circuitry 1620 to allow and/or facilitate processing circuitry 1620 to process the input information. User interface equipment 1632 can include, for example, a microphone, a proximity or other sensor, keys/buttons, a touch display, one or more cameras, a USB port, or other input circuitry. User interface equipment 1632 is also configured to allow and/or facilitate output of information from WD 1610, and to allow and/or facilitate processing circuitry 1620 to output information from WD 1610. User interface equipment 1632 can include, for example, a speaker, a display, vibrating circuitry, a USB port, a headphone interface, or other output circuitry. Using one or more input and output interfaces, devices, and circuits, of user interface equipment 1632, WD 1610 can communicate with end users and/or the wireless network, and allow and/or facilitate them to benefit from the functionality described herein.

Auxiliary equipment 1634 is operable to provide more specific functionality which may not be generally performed by WDs. This can comprise specialized sensors for doing measurements for various purposes, interfaces for additional types of communication such as wired communications etc. The inclusion and type of components of auxiliary equipment 1634 can vary depending on the embodiment and/or scenario.

Power source 1636 can, in some embodiments, be in the form of a battery or battery pack. Other types of power sources, such as an external power source (e.g., an electricity outlet), photovoltaic devices or power cells, can also be used. WD 1610 can further comprise power circuitry 1637 for delivering power from power source 1636 to the various parts of WD 1610 which need power from power source 1636 to carry out any functionality described or indicated herein. Power circuitry 1637 can in certain embodiments comprise power management circuitry. Power circuitry 1637 can additionally or alternatively be operable to receive power from an external power source; in which case WD 1610 can be connectable to the external power source (such as an electricity outlet) via input circuitry or an interface such as an electrical power cable. Power circuitry 1637 can also in certain embodiments be operable to deliver power from an external power source to power source 1636. This can be, for example, for the charging of power source 1636. Power circuitry 1637 can perform any converting or other modification to the power from power source 1636 to make it suitable for supply to the respective components of WD 1610.

Figure 17:
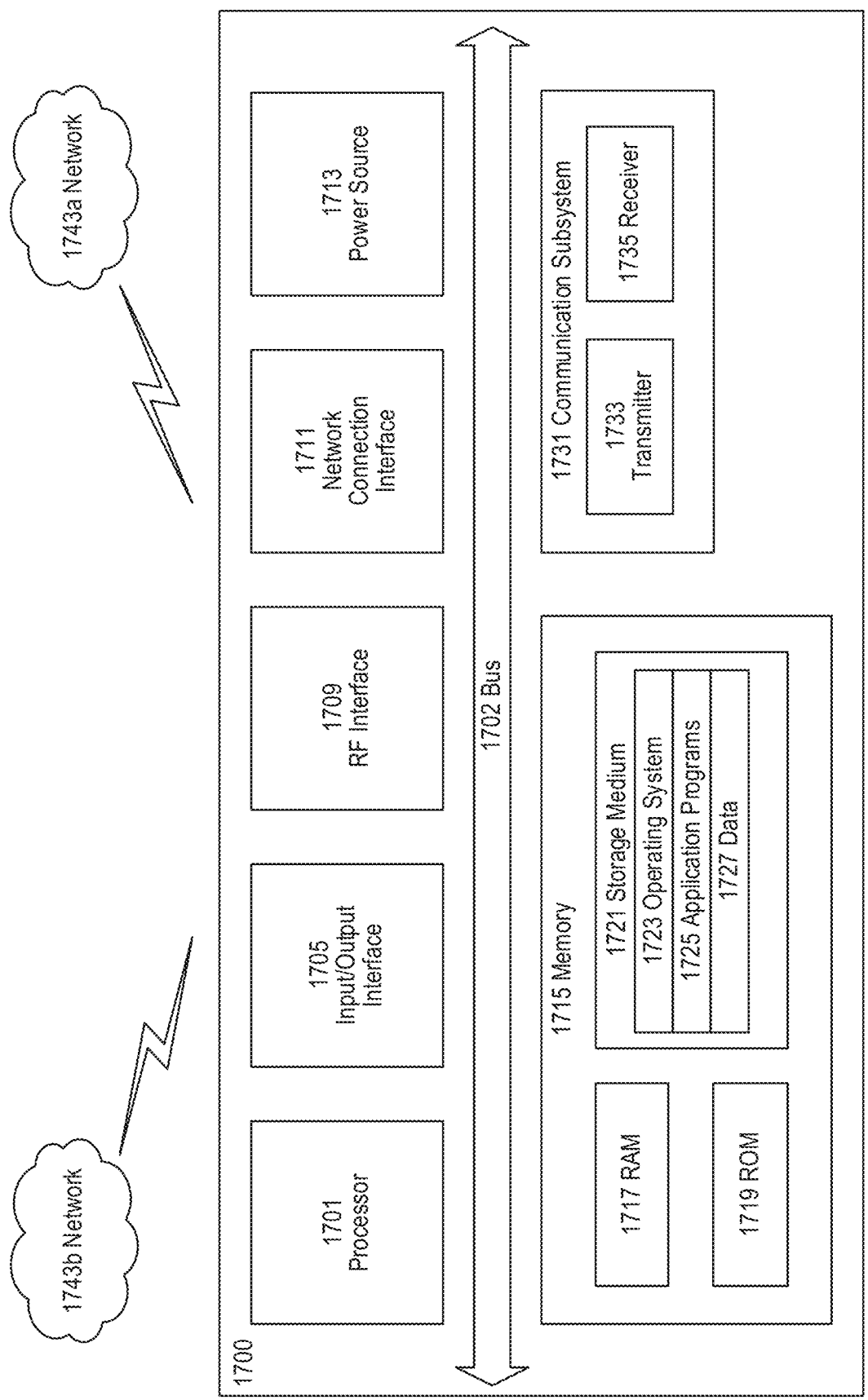
FIG. 17 illustrates an exemplary embodiment of a UE, in accordance with various aspects described herein.

FIG. 17 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 17200 can be any UE identified by 3GPP, including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by 3GPP, such as 3GPP's GSM, UMTS, LTE, and/or 5G standards. As mentioned previously, the term WD and UE can be used interchangeably. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 can include other similar types of information. Certain UEs can utilize all of the components shown in FIG. 17, or only a subset of the components. The level of integration between the components can vary from one UE to another UE. Further, certain UEs can contain multiple instances of a component, such as multiple processors, memories, transceivers, transmitters, receivers, etc.

In FIG. 17, processing circuitry 1701 can be configured to process computer instructions and data. Processing circuitry 1701 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 can include two central processing units (CPUs). Data can be information in a form suitable for use by a computer.

In the depicted embodiment, input/output interface 1705 can be configured to provide a communication interface to an input device, output device, or input and output device. UE 1700 can be configured to use an output device via input/output interface 1705. An output device can use the same type of interface port as an input device. For example, a USB port can be used to provide input to and output from UE 1700. The output device can be a speaker, a sound card, a video card, a display, a monitor, a printer, an actuator, an emitter, a smartcard, another output device, or any combination thereof. UE 1700 can be configured to use an input device via input/output interface 1705 to allow and/or facilitate a user to capture information into UE 1700. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 17, RF interface 1709 can be configured to provide a communication interface to RF components such as a transmitter, a receiver, and an antenna. Network connection interface 1711 can be configured to provide a communication interface to network 1743*a*. Network 1743*a* can encompass wired and/or wireless networks such as a local-area network (LAN), a wide-area network (WAN), a computer network, a wireless network, a telecommunications network, another like network or any combination thereof. For example, network 1743*a* can comprise a Wi-Fi network. Network connection interface 1711 can be configured to include a receiver and a transmitter interface used to communicate with one or more other devices over a communication network according to one or more communication protocols, such as Ethernet, TCP/IP, SONET, ATM, or the like. Network connection interface 1711 can implement receiver and transmitter functionality appropriate to the communication network links (e.g., optical, electrical, and the like). The transmitter and receiver functions can share circuit components, software or firmware, or alternatively can be implemented separately.

RAM 1717 can be configured to interface via bus 1702 to processing circuitry 1701 to provide storage or caching of data or computer instructions during the execution of software programs such as the operating system, application programs, and device drivers. ROM 1719 can be configured to provide computer instructions or data to processing circuitry 1701. For example, ROM 1719 can be configured to store invariant low-level system code or data for basic system functions such as basic input and output (I/O), startup, or reception of keystrokes from a keyboard that are stored in a non-volatile memory. Storage medium 1721 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 can be configured to include operating system 1723, application program 1725 such as a web browser application, a widget or gadget engine or another application, and data file 1727. Storage medium 1721 can store, for use by UE 1700, any of a variety of various operating systems or combinations of operating systems.

Storage medium 1721 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 can allow and/or facilitate UE 1700 to access computer-executable instructions, application programs or the like, stored on transitory or non-transitory memory media, to off-load data, or to upload data. An article of manufacture, such as one utilizing a communication system can be tangibly embodied in storage medium 1721, which can comprise a device readable medium.

In FIG. 17, processing circuitry 1701 can be configured to communicate with network 1743*b* using communication subsystem 1731. Network 1743*a* and network 1743*b* can be the same network or networks or different network or networks. Communication subsystem 1731 can be configured to include one or more transceivers used to communicate with network 1743*b*. For example, communication subsystem 1731 can be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver can include transmitter 1733 and/or receiver 1735 to implement transmitter or receiver functionality, respectively, appropriate to the RAN links (e.g., frequency allocations and the like). Further, transmitter 1733 and receiver 1735 of each transceiver can share circuit components, software or firmware, or alternatively can be implemented separately.

In the illustrated embodiment, the communication functions of communication subsystem 1731 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 can include cellular communication, Wi-Fi communication, Bluetooth communication, and GPS communication. Network 1743*b* can encompass wired and/or wireless networks such as a local-area network (LAN), a wide-area network (WAN), a computer network, a wireless network, a telecommunications network, another like network or any combination thereof. For example, network 1743*b* can be a cellular network, a Wi-Fi network, and/or a near-field network. Power source 1713 can be configured to provide alternating current (AC) or direct current (DC) power to components of UE 1700.

The features, benefits and/or functions described herein can be implemented in one of the components of UE 1700 or partitioned across multiple components of UE 1700. Further, the features, benefits, and/or functions described herein can be implemented in any combination of hardware, software or firmware. In one example, communication subsystem 1731 can be configured to include any of the components described herein. Further, processing circuitry 1701 can be configured to communicate with any of such components over bus 1702. In another example, any of such components can be represented by program instructions stored in memory that when executed by processing circuitry 1701 perform the corresponding functions described herein. In another example, the functionality of any of such components can be partitioned between processing circuitry 1701 and communication subsystem 1731. In another example, the non-computationally intensive functions of any of such components can be implemented in software or firmware and the computationally intensive functions can be implemented in hardware.

Figure 18:
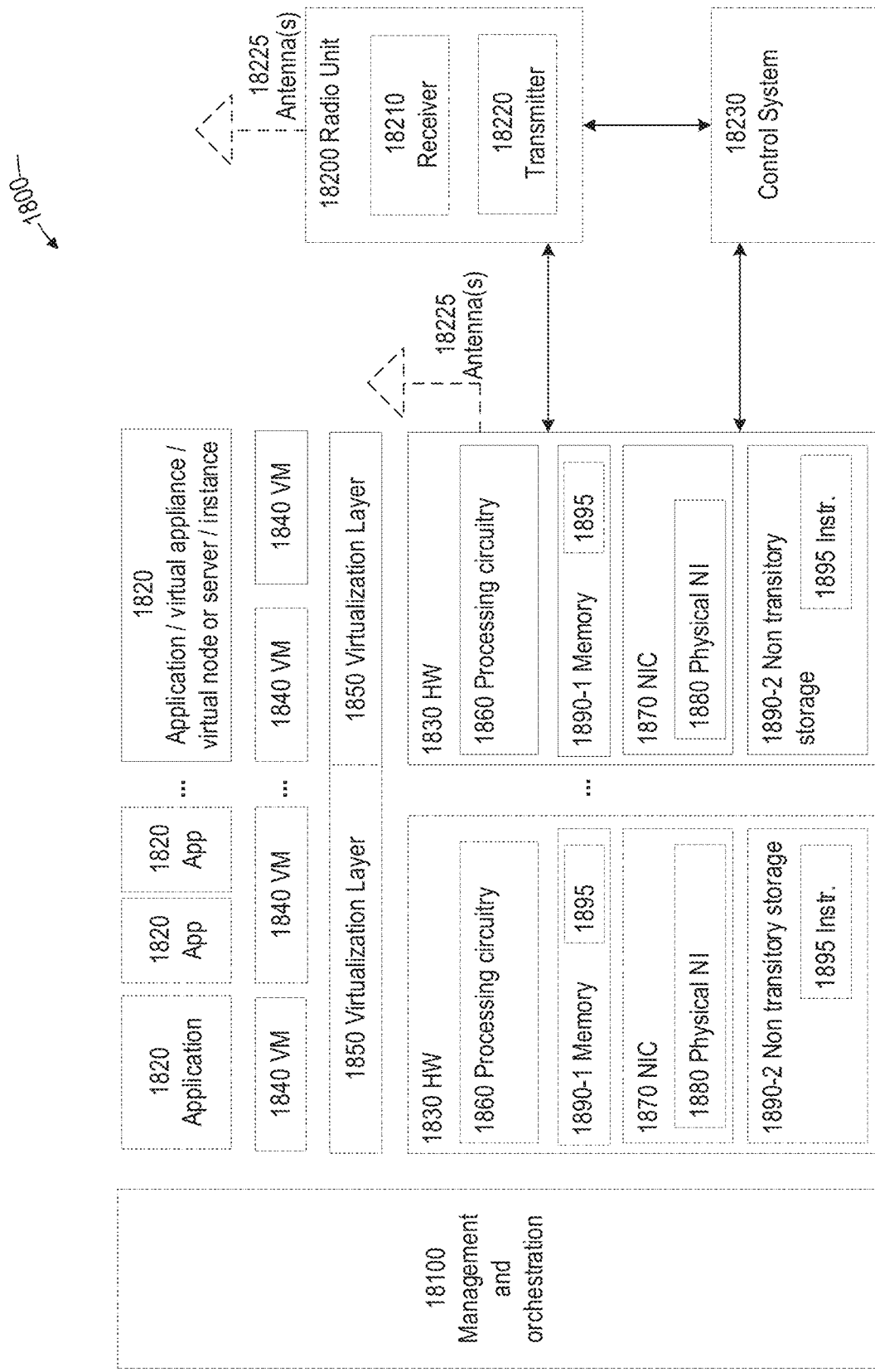
FIG. 18 is a block diagram illustrating an exemplary virtualization environment usable for implementation of various embodiments of network nodes described herein.

FIG. 18 is a schematic block diagram illustrating a virtualization environment 1800 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node can be entirely virtualized.

The functions can be implemented by one or more applications 1820 (which can alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which can be commercial off-the-shelf (COTS) processors, dedicated Application Specific Integrated Circuits (ASICs), or any other type of processing circuitry including digital or analog hardware components or special purpose processors. Each hardware device can comprise memory 1890-1 which can be non-persistent memory for temporarily storing instructions 1895 or software executed by processing circuitry 1860. Each hardware device can comprise one or more network interface controllers (NICs) 1870, also known as network interface cards, which include physical network interface 1880. Each hardware device can also include non-transitory, persistent, machine-readable storage media 1890-2 having stored therein software 1895 and/or instructions executable by processing circuitry 1860. Software 1895 can include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and can be run by a corresponding virtualization layer 1850 or hypervisor. Different embodiments of the instance of virtual appliance 1820 can be implemented on one or more of virtual machines 1840, and the implementations can be made in different ways.

During operation, processing circuitry 1860 executes software 1895 to instantiate the hypervisor or virtualization layer 1850, which can sometimes be referred to as a virtual machine monitor (VMM). Virtualization layer 1850 can present a virtual operating platform that appears like networking hardware to virtual machine 1840.

As shown in FIG. 18, hardware 1830 can be a standalone network node with generic or specific components. Hardware 1830 can comprise antenna 18225 and can implement some functions via virtualization. Alternatively, hardware 1830 can be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1840 can be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 can be coupled to one or more antennas 18225. Radio units 18200 can communicate directly with hardware nodes 1830 via one or more appropriate network interfaces and can be used in combination with the virtual components to provide a virtual node with radio capabilities, such as a radio access node or a base station.

In some embodiments, some signalling can be effected with the use of control system 18230 which can alternatively be used for communication between the hardware nodes 1830 and radio units 18200.

Figure 19:
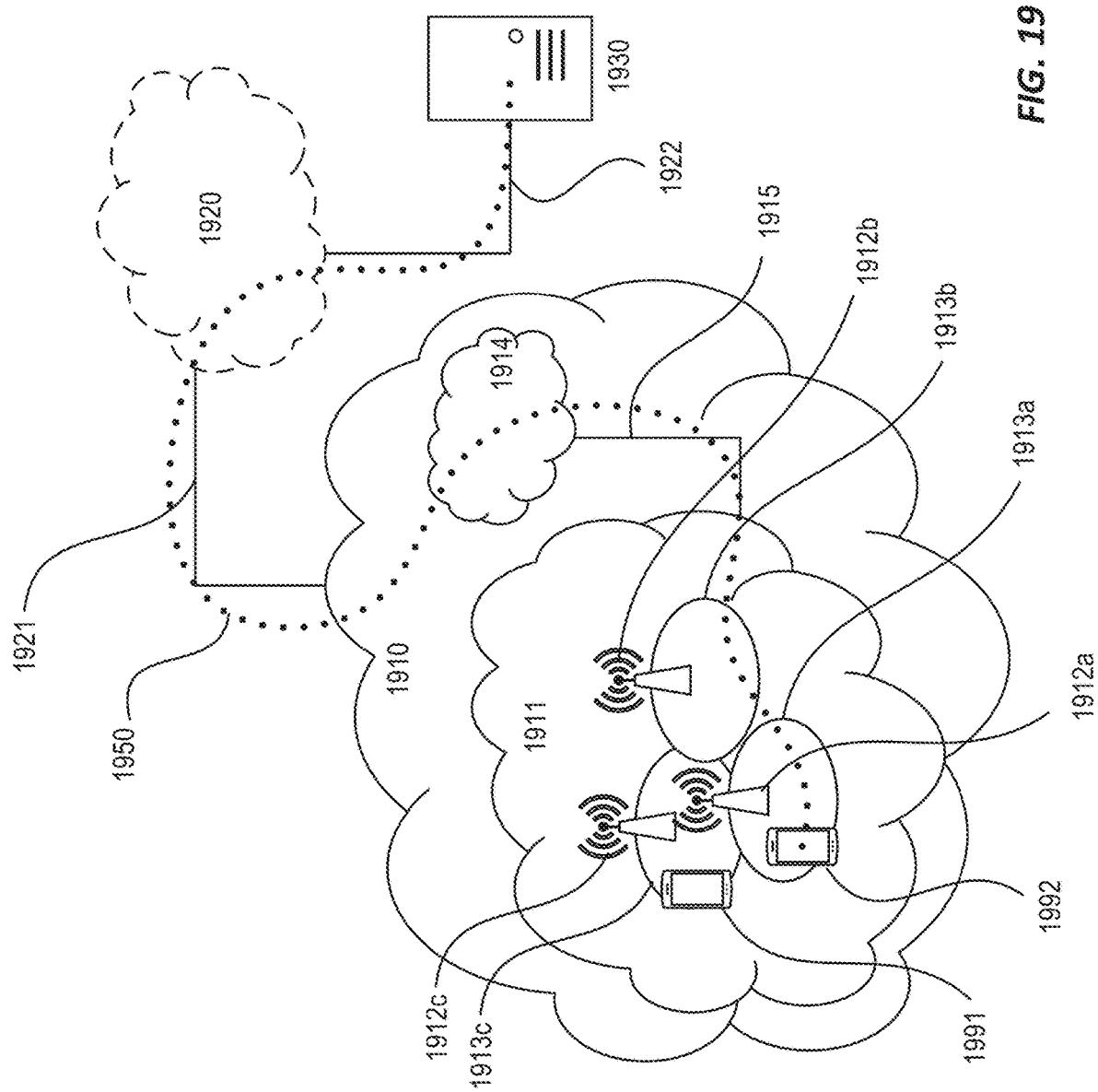
FIGS. 19-20 are block diagrams of various exemplary communication systems and/or networks, in accordance with various aspects described herein.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c can be configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which can be embodied in the hardware and/or software of a standalone server, a cloud-implemented server, a distributed server or as processing resources in a server farm. Host computer 1930 can be under the ownership or control of a service provider, or can be operated by the service provider or on behalf of the service provider. Connections 1921 and 1922 between telecommunication network 1910 and host computer 1930 can extend directly from core network 1914 to host computer 1930 or can go via an optional intermediate network 1920. Intermediate network 1920 can be one of, or a combination of more than one of, a public, private or hosted network; intermediate network 1920, if any, can be a backbone network or the Internet; in particular, intermediate network 1920 can comprise two or more sub-networks (not shown).

The communication system of FIG. 19 as a whole enables connectivity between the connected UEs 1991, 1992 and host computer 1930. The connectivity can be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 can be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which can have storage and/or processing capabilities. In particular, processing circuitry 2018 can comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 can be operable to provide a service to a remote user, such as UE 2030 connecting via OTT connection 2050 terminating at UE 2030 and host computer 2010. In providing the service to the remote user, host application 2012 can provide user data which is transmitted using OTT connection 2050.

Communication system 2000 can also include base station 2020 provided in a telecommunication system and comprising hardware 2025 enabling it to communicate with host computer 2010 and with UE 2030. Hardware 2025 can include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 can be configured to facilitate connection 2060 to host computer 2010. Connection 2060 can be direct or it can pass through a core network (not shown in FIG. 20) of the telecommunication system and/or through one or more intermediate networks outside the telecommunication system. In the embodiment shown, hardware 2025 of base station 2020 can also include processing circuitry 2028, which can comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 can also include UE 2030 already referred to. Its hardware 2035 can include radio interface 2037 configured to set up and maintain wireless connection 2070 with a base station serving a coverage area in which UE 2030 is currently located. Hardware 2035 of UE 2030 can also include processing circuitry 2038, which can comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 can be operable to provide a service to a human or non-human user via UE 2030, with the support of host computer 2010. In host computer 2010, an executing host application 2012 can communicate with the executing client application 2032 via OTT connection 2050 terminating at UE 2030 and host computer 2010. In providing the service to the user, client application 2032 can receive request data from host application 2012 and provide user data in response to the request data. OTT connection 2050 can transfer both the request data and the user data. Client application 2032 can interact with the user to generate the user data that it provides.

Figure 20:
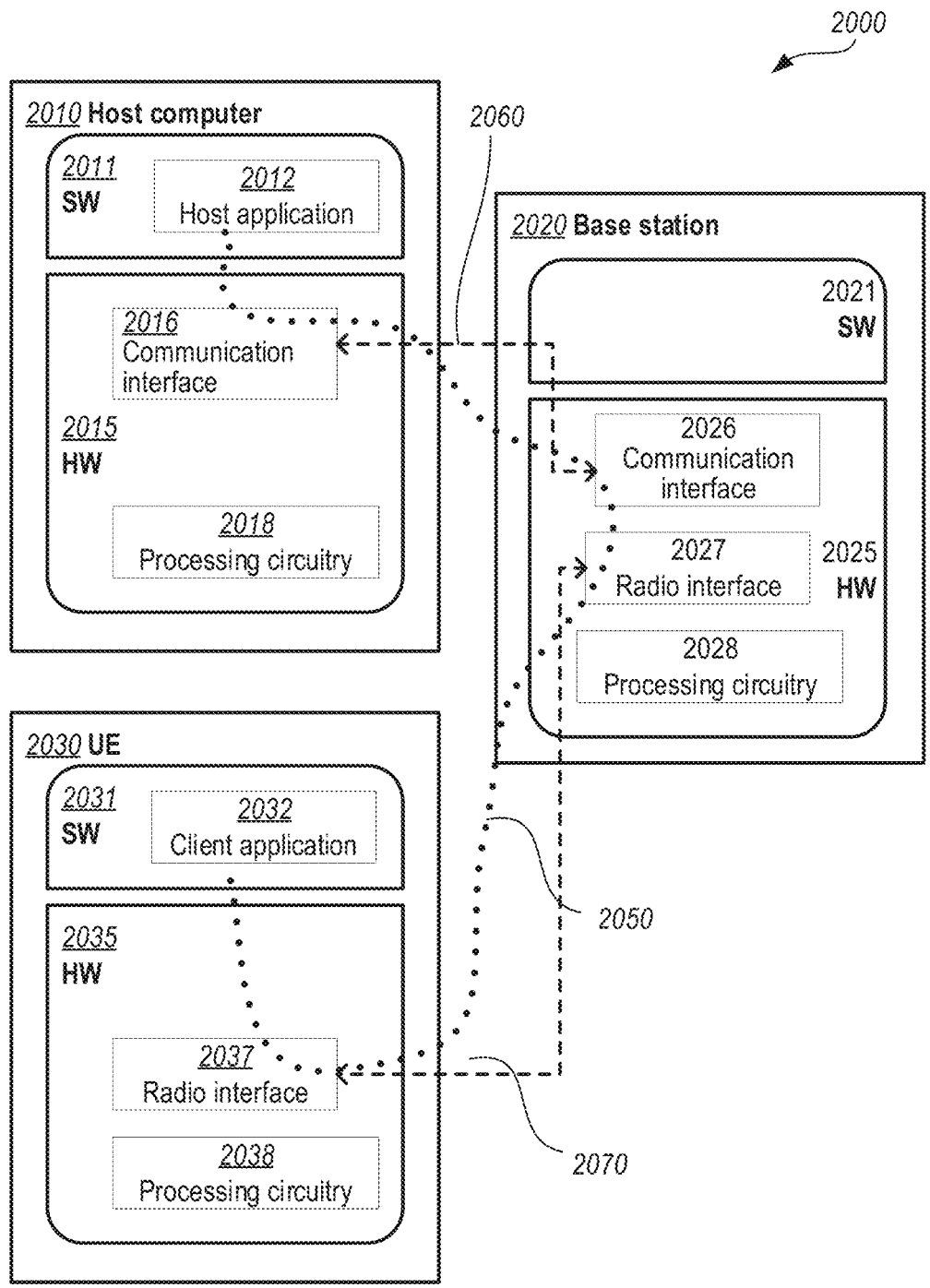

It is noted that host computer 2010, base station 2020 and UE 2030 illustrated in FIG. 20 can be similar or identical to host computer 1930, one of base stations 1912a, 1912b, 1912c and one of UEs 1991, 1992 of FIG. 19, respectively. This is to say, the inner workings of these entities can be as shown in FIG. 20 and independently, the surrounding network topology can be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure can determine the routing, which it can be configured to hide from UE 2030 or from the service provider operating host computer 2010, or both. While OTT connection 2050 is active, the network infrastructure can further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacitiy, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2050 between host computer 2010 and UE 2030, in response to variations in the measurement results. The measurement procedure and/or the network functionality for reconfiguring OTT connection 2050 can be implemented in software 2011 and hardware 2015 of host computer 2010 or in software 2031 and hardware 2035 of UE 2030, or both. In embodiments, sensors (not shown) can be deployed in or in association with communication devices through which OTT connection 2050 passes; the sensors can participate in the measurement procedure by supplying values of the monitored quantities exemplified above, or supplying values of other physical quantities from which software 2011, 2031 can compute or estimate the monitored quantities. The reconfiguring of OTT connection 2050 can include message format, retransmission settings, preferred routing etc.; the reconfiguring need not affect base station 2020, and it can be unknown or imperceptible to base station 2020. Such procedures and functionalities can be known and practiced in the art. In certain embodiments, measurements can involve proprietary UE signaling facilitating host computer 2010's measurements of throughput, propagation times, latency and the like. The measurements can be implemented in that software 2011 and 2031 causes messages to be transmitted, in particular empty or 'dummy' messages, using OTT connection 2050 while it monitors propagation times, errors etc.

FIG. 21 is a flowchart illustrating an exemplary method and/or procedure implemented in a communication system, in accordance with one embodiment. The communication system includes a host computer, a base station and a UE which, in some exemplary embodiments, can be those described with reference to FIGS. 19 and 20. For simplicity of the present disclosure, only drawing references to FIG. 21 will be included in this section. In step 2110, the host computer provides user data. In substep 2111 (which can be optional) of step 2110, the host computer provides the user data by executing a host application. In step 2120, the host computer initiates a transmission carrying the user data to the UE. In step 2130 (which can be optional), the base station transmits to the UE the user data which was carried in the transmission that the host computer initiated, in accordance with the teachings of the embodiments described throughout this disclosure. In step 2140 (which can also be optional), the UE executes a client application associated with the host application executed by the host computer.

FIG. 22 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission can pass via the base station, in accordance with the teachings of the embodiments described throughout this disclosure. In step 2230 (which can be optional), the UE receives the user data carried in the transmission.

FIG. 23 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 23 will be included in this section. In step 2310 (which can be optional), the UE receives input data provided by the host computer. Additionally or alternatively, in step 2320, the UE provides user data. In substep 2321 (which can be optional) of step 2320, the UE provides the user data by executing a client application. In substep 2311 (which can be optional) of step 2310, the UE executes a client application which provides the user data in reaction to the received input data provided by the host computer. In providing the user data, the executed client application can further consider user input received from the user. Regardless of the specific manner in which the user data was provided, the UE initiates, in substep 2330 (which can be optional), transmission of the user data to the host computer. In step 2340 of the method, the host computer receives the user data transmitted from the UE, in accordance with the teachings of the embodiments described throughout this disclosure.

FIG. 24 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 24 will be included in this section. In step 2410 (which can be optional), in accordance with the teachings of the embodiments described throughout this disclosure, the base station receives user data from the UE. In step 2420 (which can be optional), the base station initiates transmission of the received user data to the host computer. In step 2430 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON)

node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Exemplary embodiments of the present disclosure include, but are not limited to, the following enumerated embodiments.

1. A method for assigning, to a user equipment (UE) by a network node in a wireless communication network, frequency-domain resources of a communication channel shared with one or more further UEs, the method comprising:
   Determining, for the UE, an active carrier bandwidth part (BWP) usable for communicating via the shared channel;
   Selecting one or more frequency-domain resource blocks (RBs) within the active BWP;
   Encoding an indication of the selected one or more RBs using a plurality of available bits, wherein the plurality of available bits is insufficient to encode all combinations of RBs, within the active BWP, that are assignable to the UE or to the one or more further UEs; and
   Sending the encoded indication to the UE via a downlink control channel.
2. The method of embodiment 1, wherein the active BWP is one of a plurality of BWPs configured for use by the UE.
3. The method of embodiment 2, wherein the indication comprises a starting virtual resource block ($RB_{start}$) and a length of contiguously allocated resource blocks $L_{RBs}$.
4. The method of embodiment 3, wherein the plurality of available bits is less than $\lceil \log_2(N_{BWP}^{size}(N_{BWP}^{size}+1)/2) \rceil$, where $N_{BWP}^{size}$ is the number of RBs in the active BWP.
5. The method of embodiment 4, wherein:
   the indication is usable to indicate all possible lengths ($L_{RBs}=1, 2, \ldots, N_{BWP}^{size}$) of contiguously allocated resource blocks; and
   the starting virtual resource block ($RB_{start}$) is encoded with a resolution of $\alpha$ RBs.
6. The method of embodiment 4, wherein the resolution, $\alpha$, of the starting virtual resource block is determined based on a relation between the number of RBs comprising the active BWP and one of:
   the number of RBs comprising another one of the plurality of BWPs configured for use by the UE; and
   the maximum size of a BWP that can be supported by the plurality of available bits.
7. The method of embodiment 4, wherein the indication is usable to indicate:
   a starting virtual resource block no greater than $N_{BWP}^{size} - L_{min}$, where $1 \leq L_{min} \leq N_{BWP}^{size}$; and
   a length no less than $L_{min}$.
8. The method of embodiment 4, wherein the indication is usable to indicate:
   a starting virtual resource block no greater than $N_{BWP,2}^{size} - 1$; and
   a length no greater than $L_{max}$, where $L_{max}$ is less than or equal to the minimum of: the number of RBs in the active BWP and one of:
   the number of RBs comprising another one of the plurality of BWPs configured for use by the UE; and
   the maximum size of a BWP that can be supported by the plurality of available bits.
9. The method of embodiment 1, further comprising encoding the indication to indicate a particular puncturing pattern configured to exclude particular resource combinations, each excluded resource combination comprising a starting virtual resource block ($RB_{start}$) and a length of contiguously allocated resource blocks $L_{RBs}$.
10. The method of embodiment 3, wherein the starting virtual resource block ($RB_{start}$) is encoded with a resolution of $K_S$ RBs and the length of contiguously allocated resource blocks ($L_{RBs}$) is encoded with a resolution of $K_L$ RBs.
11. The method of embodiment 10, wherein the indicator is usable to represent zero as a minimum value of $RB_{start}$, and to represent $K_L$ as a minimum value of $L_{RBs}$.
12. The method of embodiment 3, wherein:
   the active BWP comprises $N_{BWP,1}^{size}$ RBs; and
   the plurality of available bits is determined based on the number of RBs ($N_{BWP,2}^{size}$) comprising another one of the plurality of BWPs configured for use by the UE.
13. The method of embodiment 12, wherein at least one of $K_S$ and $K_L$ is determined based on a function of the ratio between $N_{BWP,1}^{size}$ and $N_{BWP,2}^{size}$.
14. The method of embodiment 13, wherein both $K_S$ and $K_L$ are determined to be if the function of the ratio between $N_{BWP,1}^{size}$ and $N_{BWP,2}^{size}$ is below a certain threshold.
15. The method of embodiment 12, wherein at least one of $K_S$ and $K_L$ is equal to one, and the other of $K_S$ and $K_L$ is determined based on a function of the square of the ratio between $N_{BWP,1}^{size}$ and $N_{BWP,2}^{size}$.
16. A method for receiving, by a user equipment (UE) from a network node in a wireless communication network, an assignment of frequency-domain resources of a communication channel shared with one or more further UEs, the method comprising:
   Receiving an indication of an active carrier bandwidth part (BWP) usable for communicating via the shared channel;
   Receiving, via a downlink control channel, an indication of one or more frequency-domain resource blocks (RBs) assigned to the UE within the active BWP, wherein the indication is encoded with a plurality of bits that are insufficient to encode all combinations of RBs, within the active BWP, that are assignable to the UE or to the one or more further UEs; and
   Decoding the indication to obtain a starting virtual resource block ($RB_{start}$) and a length of contiguously allocated resource blocks ($L_{RBs}$) that specify the one or more frequency-domain resource blocks (RBs) assigned to the UE; and
   Transmitting or receiving data using the assigned RBs.
17. The method of embodiment 16, wherein the active BWP is one of a plurality of BWPs configured for use by the UE.
18. The method of embodiment 16, wherein the plurality of available bits is less than $\lceil \log_2(N_{BWP}^{size}(N_{BWP}^{size}+1)/2) \rceil$, where $N_{BWP}^{size}$ is the number of RBs in the active BWP.
19. The method of embodiment 18, wherein:
   the indication is usable to indicate all possible lengths ($L_{RBs}=1, 2, \ldots, N_{BWP}^{size}$) of contiguously allocated resource blocks; and
   the starting virtual resource block ($RB_{start}$) is encoded with a resolution of $\alpha$ RBs.
20. The method of embodiment 18, wherein the resolution, a, of the starting virtual resource block is determined based on a relation between the number of RBs comprising the active BWP and one of:
   the number of RBs comprising another one of the plurality of BWPs configured for use by the UE; and
   the maximum size of a BWP that can be supported by the plurality of available bits.

21. The method of embodiment 18, wherein the indication is usable to indicate:
a starting virtual resource block no greater than $N_{BWP}^{size} - L_{min}$, where $1 \leq L_{min} \leq N_{BWP}^{size}$; and
a length no less than $L_{min}$.

22. The method of embodiment 18, wherein the indication is usable to indicate:
a starting virtual resource block no greater than $N_{BWP,2}^{size} - 1$; and
a length no greater than $L_{max}$, where $L_{max}$ is less than or equal to the minimum of: the number of RBs in the active BWP and one of:
the number of RBs comprising another one of the plurality of BWPs configured for use by the UE; and
the maximum size of a BWP that can be supported by the plurality of available bits.

23. The method of embodiment 16, wherein the received indication has been encoded to indicate a particular puncturing pattern configured to exclude particular resource combinations, each excluded resource combination comprising a starting virtual resource block ($RB_{start}$) and a length of contiguously allocated resource blocks $L_{RBs}$.

24. The method of embodiment 16, wherein the starting virtual resource block ($RB_{start}$) is encoded with a resolution of $K_S$ RBs and the length of contiguously allocated resource blocks ($L_{RBs}$) is encoded with a resolution of $K_L$ RBs.

25. The method of embodiment 24, wherein the indicator is usable to represent zero as a minimum value of $RB_{start}$, and to represent $K_L$ as a minimum value of $L_{RBs}$.

26. The method of embodiment 17, wherein:
the active BWP comprises $N_{BWP,1}^{size}$ RBs; and
the plurality of available bits is determined based on the number of RBs ($N_{BWP,2}^{size}$) comprising another one of the plurality of BWPs configured for use by the UE.

The invention claimed is:

1. A user equipment (UE) configured to communicate with a network node in a wireless communication network, the UE comprising:
power supply circuitry configured to supply power to the UE;
transceiver circuitry configured to communicate with the network node; and
processing circuitry operably coupled to the transceiver circuitry, whereby the processing circuitry and the transceiver circuitry are configured to:
receive, from the network node, an indication of an active bandwidth part (BWP), wherein the active BWP is of a size $N_{BWP,1}^{size}$ in number of frequency-domain resource blocks (RBs);
receive, via a downlink control channel, an indication of one or more assigned frequency-domain RBs within the active BWP, wherein the indication of the one or more assigned frequency-domain RBs is encoded with a number of bits, the number being a plurality and being related to a size $N_{BWP,2}^{size}$ of another BWP than the active BWP, wherein the size $N_{BWP,2}^{size}$ is smaller than the size $N_{BWP,1}^{size}$; and
decode the indication of the one or more assigned frequency-domain RBs to obtain the one or more assigned RBs represented by a starting virtual RB, $RB_{start}$, and a length of contiguously allocated RBs, $L_{RBs}$, within the active BWP, wherein the starting virtual RB is encoded with a resolution of K RBs, wherein K is determined based on a ratio of the size $N_{BWP,1}^{size}$ and the size $N_{BWP,2}^{size}$.

2. The UE of claim 1, wherein the number of bits is equal to $\lceil \log_2(N_{BWP,2}^{size}(N_{BWP,2}^{size}+1)/2) \rceil$.

3. The UE of claim 1, wherein lengths of contiguously allocated resource blocks are encoded with the resolution of K RBs.

4. The UE of claim 3, wherein the indication of the one or more assigned frequency-domain RBs is encoded such that:
a minimum value of $RB_{start}$, that the indication of the one or more assigned frequency-domain RBs can represent is zero; and
a minimum value of $L_{RBs}$ that the indication of the one or more assigned frequency-domain RBs can represent is K.

5. The UE of claim 1, wherein K is determined based on a floor function of ($N_{BWP,1}^{size}$ divided by $N_{BWP,2}^{size}$).

6. The UE of claim 1, wherein K is determined to be equal to one if the function of ($N_{BWP,1}^{size}$ divided by $N_{BWP,2}^{size}$) is below a particular threshold.

7. The UE of claim 1, wherein the combination of the processing circuitry and the transceiver circuitry is further configured to transmit or receive data, with the network node, using the one or more assigned frequency-domain RBs within the active BWP.

8. A method for receiving, by a user equipment (UE) from a network node in a wireless communication network, an assignment of frequency-domain resource blocks (RBs) of a communication channel, the method comprising:
receiving, from the network node, an indication of an active bandwidth part (BWP), wherein the active BWP is of a size $N_{BWP,1}^{size}$ in number of frequency-domain RBs;
receiving, via a downlink control channel, an indication of one or more assigned frequency-domain RBs within the active BWP, wherein the indication of the one or more assigned frequency-domain RBs is encoded with a number of bits, the number being a plurality and being related to a size $N_{BWP,2}^{size}$ of another BWP than the active BWP, wherein the size $N_{BWP,2}^{size}$ is smaller than the size $N_{BWP,1}^{size}$; and
decoding the indication of the one or more assigned frequency-domain RBs to obtain the one or more assigned RBs represented by a starting virtual RB, $RB_{start}$, and a length of contiguously allocated RBs, $L_{RBs}$, within the active BWP, wherein the starting virtual RB is encoded with a resolution of K RBs, wherein K is determined based on a ratio of the size $N_{BWP,1}^{size}$ and the size $N_{BWP,2}^{size}$.

9. The method of claim 8, wherein lengths of contiguously allocated resource blocks are encoded with the resolution of K RBs.

10. The method of claim 9, wherein the indication of the one or more assigned frequency-domain RBs is encoded such that:
a minimum value of $RB_{start}$, that the indication of the one or more assigned frequency-domain RBs can represent is zero; and
a minimum value of $L_{RBS}$ that the indication of the one or more assigned frequency-domain RBs can represent is K.

11. The method of claim 8, wherein K is determined based on a floor function of ($N_{BWP,1}^{size}$ divided by $N_{BWP,2}^{size}$).

12. The method of claim 8, wherein K is determined to be equal to one if the function of ($N_{BWP,1}^{size}$ divided by $N_{BWP,2}^{size}$) is below a particular threshold.

13. The method of claim 8, further comprising transmitting or receiving data, with the network node, using the one or more assigned frequency-domain RBs within the active BWP.

14. A network node configured to communicate with a user equipment (UE) in a wireless communication network, the network node comprising:
   power supply circuitry configured to supply power to the network node;
   transceiver circuitry configured to communicate with the UE; and
   processing circuitry operably coupled to the transceiver circuitry, whereby the processing circuitry and the transceiver circuitry are configured to:
      send, to the UE, an indication of an active bandwidth part (BWP), wherein the active BWP is of a size $N_{BWP,1}^{size}$ in number of frequency-domain resource blocks (RBs);
      select frequency-domain RBs, within the active BWP, to be assigned to the UE;
      encode an indication of the selected frequency-domain RBs represented by a starting virtual RB, $RB_{start}$, and a length of contiguously allocated RBs, $L_{RBs}$, using a number of bits, the number being a plurality and being related to a size $N_{BWP,2}^{size}$ of another BWP than the active BWP, wherein the size $N_{BWP,2}^{size}$ is smaller than the size $N_{BWP,1}^{size}$, and wherein the starting virtual RB is encoded with a resolution of K RBs, wherein K is determined based on a ratio of the size $N_{BWP,1}^{size}$ and the size $N_{BWP,2}^{size}$; and
      send the encoded indication to the UE via a downlink control channel.

15. The network node of claim 14, wherein lengths of contiguously allocated resource blocks are encoded with the resolution of K RBs.

16. The network node of claim 15, wherein the indication of the selected frequency-domain RBs is encoded such that:
   a minimum value of $RB_{start}$ that the indication of the selected frequency-domain RBs can represent is zero; and
   a minimum value of $L_{RBs}$ that the indication of the selected frequency-domain RBs can represent is K.

17. The network node of claim 14, wherein K is determined based on a floor function of ($N_{BWP,1}^{size}$ divided by $N_{BWP,2}^{size}$).

18. A method for assigning, to a user equipment (UE) by a network node in a wireless communication network, frequency-domain resource blocks (RBs) of a communication channel, the method comprising:
   sending, to the UE, an indication of an active bandwidth part, BWP, wherein the active BWP is of a size $N_{BWP,1}^{size}$ in number of frequency-domain RBs;
   selecting frequency-domain RBs, within the active BWP, to be assigned to the UE;
   encoding an indication of the selected frequency-domain RBs represented by a starting virtual RB, $RB_{start}$, and a length of contiguously allocated RBs, $L_{RBs}$, using a number of bits, the number being a plurality and being related to a size $N_{BWP,2}^{size}$ of another BWP than the active BWP, wherein the size $N_{BWP,2}^{size}$ is smaller than the size $N_{BWP,1}^{size}$, and wherein the starting virtual RB is encoded with a resolution of K RBs, wherein K is determined based on a ratio of the size and the size $N_{BWP,1}^{size}$ and the size $N_{BWP,2}^{size}$; and
   sending the encoded indication to the UE via a downlink control channel.

19. The method of claim 18, wherein lengths of contiguously allocated resource blocks are encoded with the resolution of K RBs.

20. The method of claim 19, wherein the indication of the selected frequency-domain RBs is encoded such that:
   a minimum value of $RB_{start}$ that the indication of the selected frequency-domain RBs can represent is zero; and
   a minimum value of $L_{RBs}$ that the indication of the selected frequency-domain RBs can represent is K.

21. The method of claim 18, wherein K is determined based on a floor function of ($N_{BWP,1}^{size}$ divided $N_{BWP,2}^{size}$).

* * * * *

UNITED STATES PATENT AND TRADEMARK OFFICE
CERTIFICATE OF CORRECTION

PATENT NO. : 11,006,419 B2
APPLICATION NO. : 16/566014
DATED : May 11, 2021
INVENTOR(S) : Li et al.

Page 1 of 4

It is certified that error appears in the above-identified patent and that said Letters Patent is hereby corrected as shown below:

In the Drawings

In Fig. 15, Sheet 9 of 16, for block "1510", in Line 1, and on the title page, the representative print figure, delete "and indication" and insert -- an indication --, therefor.

In the Specification

In Column 2, Line 38, delete "PRB," and insert -- $PRB_i$ --, therefor.

In Column 2, Line 40, delete "PRB₀," and insert -- $PRB_0$ --, therefor.

In Column 2, Line 41, delete "PRB," and insert -- $PRB_1$ --, therefor.

In Column 2, Lines 41-42, delete "sub-carries" and insert -- sub-carriers --, therefor.

In Column 3, Line 12, delete "Broad Band)" and insert -- Broadband) --, therefor.

In Column 4, Line 50, delete "(PDCCH)" and insert -- (PDCCHs) --, therefor.

In Column 5, Line 1, delete "shows" and insert -- show --, therefor.

In Column 7, Line 19, delete "(CG)." and insert -- (CGs). --, therefor.

In Column 7, Line 49, delete "$N_{BWP,j}^{size}+1$, where" and insert -- $N_{BWP,j}^{size}-1$, where $i$ --, therefor.

In Column 8, Line 60, delete "though" and insert -- through --, therefor.

In Column 9, Line 41, delete "can provided" and insert -- can provide --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,006,419 B2

In Column 9, Line 63, delete "RB$_{start}$)" and insert -- (RB$_{start}$) --, therefor.

In Column 10, Line 64, delete "L$_{min}$}" and insert -- $N_{BWP}^{size} - L_{min}$ } --, therefor.

In Column 10, Line 67, delete "N'$_{BWP}^{size}$=N$_{BWP}^{size}$–L+1" and insert -- $N'^{size}_{BWP} = N^{size}_{BWP} - L_{min} + 1$ --, therefor.

In Column 11, Lines 55-56, delete "RIV=N$_{BWP}^{size}$(N'$_{BWP}^{size}$-L$_{RBs}$+1)+(N'$_{BWP}^{size}$-1-RB$_{start}$)" and insert -- $RIV = N'^{size}_{BWP}(N'^{size}_{BWP} - L_{RBs} + 1) + (N'^{size}_{BWP} - 1 - RB_{start})$ --, therefor.

In Column 13, Lines 29-30, delete "RB$_{start,max}$=min((N$_{BWP,2}^{size}$-1)×K$_S$,(⌊N$_{BWP,1}^{size}$/K$_S$⌋)×K$_S$), and" and insert -- $RB_{start,max} = min((N_{BWP,2}^{size} - 1) \times K_S, (\lfloor N_{BWP,1}^{size}/K_S \rfloor - 1) \times K_S)$, and --, therefor.

In Column 13, Line 55, delete "(L'$_{RBs}$–1)<=⌊N$_{BWP}^{size}$/2⌋" and insert -- $(L'_{RBs} - 1) \texttt{<=} \lfloor N'^{size}_{BWP}/2 \rfloor$ --, therefor.

In Column 14, Line 10, delete "N$_{BWP,2}^{size}$⌊N$_{BWP,1}^{size}$/K$_S$⌋" and insert -- N$_{BWP,2}^{size}$ < ⌊N$_{BWP,1}^{size}$/K$_S$⌋ --, therefor.

In Column 15, Line 5, delete "RB$_{start,max}$=min((N$_{BWP,2}^{size}$-1)×K$_S$,(⌊N$_{BWP,1}^{size}$/K$_S$⌋1)×K$_S$)" and insert -- $RB_{start,max} = min((N_{BWP,2}^{size} - 1) \times K_S, (\lfloor N_{BWP,1}^{size}/K_S \rfloor - 1) \times K_S)$ --, therefor.

In Column 16, Line 8, delete "K=⌊αN$_{BWP,1}^{size}$/N$_{BWP,2}^{size}$⌋," and insert -- K=⌊α N$_{BWP,1}^{size}$/N$_{BWP,2}^{size}$⌋, --, therefor.

In Column 16, Line 27, delete "a" and insert -- α --, therefor.

In Column 16, Line 28, delete "K$_S$=⌊(αN$_{BWP,1}^{size}$/N$_{BWP,2}^{size}$)²⌋." and insert -- K$_S$= ⌊(α N$_{BWP,1}^{size}$/N$_{BWP,2}^{size}$)²⌋. --, therefor.

In Column 16, Line 31, delete "a" and insert -- α --, therefor.

In Column 16, Line 32, delete and "⌊(αN$_{BWP,1}^{size}$/N$_{BWP,2}^{size}$)²⌋." and insert -- ⌊(α N$_{BWP,1}^{size}$/N$_{BWP,2}^{size}$)²⌋. --, therefor.

CERTIFICATE OF CORRECTION (continued)
U.S. Pat. No. 11,006,419 B2

In Column 16, Line 33, delete "$\alpha N_{BWP,1}^{size} - N_{BWP,2}^{size}$" and insert -- $\alpha\, N_{BWP,1}^{size} - N_{BWP,2}^{size}$ --, therefor.

In Column 16, Line 41, delete "one of more" and insert -- one or more --, therefor.

In Column 16, Line 60, delete "(PDCCH)" and insert -- (PDCCHs) --, therefor.

In Column 17, Line 27, delete "channel" and insert -- channel. --, therefor.

In Column 17, Line 42, delete "channel" and insert -- channel. --, therefor.

In Column 19, Line 26, delete "$N'_{BWP}{}^{size}(N_{BWP}{}^{size} - L'_{RBs} + 1) + (N'_{BWP}{}^{size} - 1 - RB'_{start})$" and insert -- $N'_{BWP}{}^{size}(N'_{BWP}{}^{size} - L'_{RBs} + 1) + (N'_{BWP}{}^{size} - 1 - RB'_{start})$ --, therefor.

In Column 22, Line 10, delete "manner" and insert -- manner. --, therefor.

In Column 24, Line 30, delete "(CPE)." and insert -- (CPE), --, therefor.

In Column 24, Line 38, delete "(IoT)" and insert -- (IoTs) --, therefor.

In Column 24, Line 46, delete "(NB- IoT)" and insert -- (NB- IoTs) --, therefor.

In Column 25, Line 17, delete "comprise" and insert -- comprises --, therefor.

In Column 25, Line 18, delete "Radio front end circuitry 1614" and insert -- Radio front end circuitry 1612 --, therefor.

In Column 26, Line 21, delete "manner" and insert -- manner. --, therefor.

In Column 27, Line 64, delete "UE 17200" and insert -- UE 1700 --, therefor.

In Column 28, Line 14, delete "power source 1733," and insert -- power source 1713, --, therefor.

In Column 29, Line 43, delete "(RAID)," and insert -- (RAIDs), --, therefor.

In Column 32, Line 18, delete "(VNE)." and insert -- (VNEs). --, therefor.

In Column 34, Line 65, delete "capacitiy," and insert -- capacity, --, therefor.

In Column 37, Line 48, delete "equipped" and insert -- equipment --, therefor.

In Column 37, Line 50, delete "(IoT)" and insert -- (IoTs) --, therefor.

In Column 40, Line 61, delete "a," and insert -- $\alpha$, --, therefor.

CERTIFICATE OF CORRECTION (continued)
U.S. Pat. No. 11,006,419 B2

In the Claims

In Column 42, Line 60, in Claim 10, delete "$L_{RBS}$" and insert -- $L_{RBs}$ --, therefor.

In Column 43, Line 23, in Claim 14, delete "$L_{RBs}$" and insert -- $L_{RBs}$, --, therefor.

In Column 44, Line 1, in Claim 16, delete "$L_{RBS}$" and insert -- $L_{RBs}$ --, therefor.